United States Patent
DeVaul

(10) Patent No.: US 9,290,258 B1
(45) Date of Patent: Mar. 22, 2016

(54) HOT AIR BALLOON WITH SOLAR COLLECTOR AND HEAT-ENGINE-DRIVEN FUEL CELL

(71) Applicant: Google Inc., Mountain View, CA (US)

(72) Inventor: Richard Wayne DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 14/310,161

(22) Filed: Jun. 20, 2014

(51) Int. Cl.
*B64B 1/40* (2006.01)

(52) U.S. Cl.
CPC ........................................ *B64B 1/40* (2013.01)

(58) Field of Classification Search
CPC ........................................................ B64B 1/40
See application file for complete search history.

(56) References Cited

U.S. PATENT DOCUMENTS

| | | | |
|---|---|---|---|
| 3,029,596 | A | 4/1962 | Hanold et al. |
| 4,073,516 | A | 2/1978 | Kling |
| 4,174,082 | A | 11/1979 | Eshoo |
| 4,237,868 | A | 12/1980 | Overton |
| 4,361,297 | A | 11/1982 | Pommereau et al. |
| 4,391,099 | A | 7/1983 | Sorensen |
| 4,986,494 | A | 1/1991 | Tockert |
| 5,890,676 | A | 4/1999 | Coleman |
| 6,119,979 | A | 9/2000 | Lee et al. |
| 6,305,641 | B1 | 10/2001 | Onda |
| 6,648,272 | B1 | 11/2003 | Kothmann |
| 6,908,702 | B2 | 6/2005 | McElroy |
| 7,249,733 | B2 | 7/2007 | Palmer |
| 7,261,255 | B2 | 8/2007 | Li |
| 7,573,147 | B2 | 8/2009 | Karim |
| 7,887,007 | B2 | 2/2011 | Mitchell |
| 7,913,948 | B2 | 3/2011 | Porter |
| 8,033,497 | B2 | 10/2011 | Kwok et al. |
| 8,061,651 | B2 | 11/2011 | Sinsabaugh |
| 8,074,638 | B2 | 12/2011 | Cummings |
| 8,256,705 | B2 | 9/2012 | Smith |

(Continued)

FOREIGN PATENT DOCUMENTS

| | | | |
|---|---|---|---|
| DE | 3844505 | A1 | 5/1990 |
| FR | 2803884 | A1 | 7/2001 |

(Continued)

OTHER PUBLICATIONS

Nachbar, Daniel, and John Fabel, "Next Generation Thermal Airship," AIAA 3rd Annual Aviation Technology, Integration, and Operations (ATIO) Technical Forum, 2003.

*Primary Examiner* — Audrey K Bradley
(74) *Attorney, Agent, or Firm* — McDonnell Boehnen Hulbert & Berghoff LLP

(57) ABSTRACT

An example balloon system for long-duration flight can include an optically transparent envelope for solar greenhouse heating of lift gas within, a fuel cell inside a bladder within the envelope, and a solar collector beneath the bladder configured to concentrate solar energy in a focal region below the bladder. The fuel cell can include hydrogen gas, oxygen gas, and a water reservoir in a bottom portion of the bladder, and could be configured to generate electricity to run a heater to heat the lift gas during night-time hours. The example system can also include a heat engine configured with a hot side in the focal region and a cold side in the water reservoir. The heat engine could be configured to generate power by transferring heat from the hot side to the cold side, and the power could be used to recharge the fuel cell during daylight hours.

30 Claims, 10 Drawing Sheets

(56) References Cited

U.S. PATENT DOCUMENTS

| | | |
|---|---|---|
| 8,342,442 B1 | 1/2013 | Dancila |
| 8,387,914 B2 | 3/2013 | Smith |
| 2006/0000945 A1 | 1/2006 | Voss |
| 2008/0196410 A1 | 8/2008 | Primlani |
| 2009/0294576 A1* | 12/2009 | LaForge ............. H01M 8/0656 244/30 |
| 2011/0101692 A1 | 5/2011 | Bilaniuk |
| 2012/0235410 A1 | 9/2012 | Serrano |
| 2013/0037650 A1 | 2/2013 | Heppe |
| 2013/0160451 A1 | 6/2013 | Seifert |
| 2014/0048646 A1* | 2/2014 | DeVaul ................. B64B 1/40 244/97 |

FOREIGN PATENT DOCUMENTS

| | | |
|---|---|---|
| GB | 2261705 | 5/1993 |
| JP | 2007205341 A1 | 8/2007 |
| WO | 9612642 | 5/1996 |
| WO | WO2014028201 | 2/2014 |

* cited by examiner

*Side View*

*Top View*

HOT AIR BALLOON WITH SOLAR COLLECTOR AND HEAT-ENGINE-DRIVEN FUEL CELL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon system includes: an optically transparent envelope configured for solar greenhouse heating of lift gas within the optically transparent envelope; a bladder inside the optically transparent envelope; a fuel cell system inside the bladder, wherein the fuel cell system includes a supply of hydrogen gas, a supply of oxygen gas, and a water reservoir in a bottom portion of the bladder, and wherein the fuel cell system is configured to generate electricity; a reflective solar collector beneath the bladder configured to concentrate solar energy in a focal region inside the optically transparent envelope and below the bladder; and a heat engine configured with a hot side in the focal region of the reflective solar collector and a cold side in the water reservoir, wherein the heat engine is configured to generate power by transferring heat from the hot side to the cold side, and wherein a portion of the transferred heat is used for causing at least a portion of the water in the reservoir to vaporize.

In another aspect, a method involves: generating electrical power with a fuel cell system inside a bladder within an optically transparent envelope of a balloon system, the optically transparent envelope being configured for solar greenhouse heating of lift gas within the optically transparent envelope, and the balloon system including a reflective solar collector beneath the bladder; orienting the reflective solar collector to concentrate solar energy in a focal region below the bladder and containing a hot side of a heat engine, the heat engine being configured with a cold side in a water reservoir of the fuel cell system in a bottom portion of the bladder; generating power with the heat engine by heat transfer from the hot side of the heat engine to the cold side of the heat engine; and vaporizing at least a portion of the water in the water reservoir using at least a portion of the transferred heat.

In a further aspect, a computer-implemented method involves: operating a fuel cell system inside a bladder within an optically transparent envelope of a balloon system to cause the fuel cell to generate electrical power, the optically transparent envelope being configured for solar greenhouse heating of lift gas within the optically transparent envelope, and the balloon system including a reflective solar collector beneath the bladder; orienting the reflective solar collector to concentrate solar energy in a focal region below the bladder and containing a hot side of a heat engine, the heat engine being configured with a cold side in a water reservoir of the fuel cell system in a bottom portion of the bladder; and operating the heat engine to cause the heat engine to generate power using heat transferred from the hot side of the heat engine to the cold side of the heat engine, wherein at least a portion of the transferred heat is used for vaporizing at least a portion of the water in the water reservoir.

In still a further aspect, non-transitory computer readable medium may have stored therein instructions that, upon execution by one or more processors of a balloon system, cause the balloon system to carry out functions including: operating a fuel cell system inside a bladder within an optically transparent envelope of the balloon system to cause the fuel cell to generate electrical power, wherein the optically transparent envelope is configured for solar greenhouse heating of lift gas within the optically transparent envelope, and the balloon system includes a reflective solar collector beneath the bladder; orienting the reflective solar collector to concentrate solar energy in a focal region below the bladder and containing a hot side of a heat engine, wherein the heat engine is configured with a cold side in a water reservoir of the fuel cell system in a bottom portion of the bladder; and operating the heat engine to cause the heat engine to generate power using heat transferred from the hot side of the heat engine to the cold side of the heat engine, wherein at least a portion of the transferred heat is used for vaporizing at least a portion of the water in the water reservoir.

These as well as other aspects, advantages, and alternatives, will become apparent to those of ordinary skill in the art by reading the following detailed description, with reference where appropriate to the accompanying drawings.

DETAILED DESCRIPTION

Figure 1:
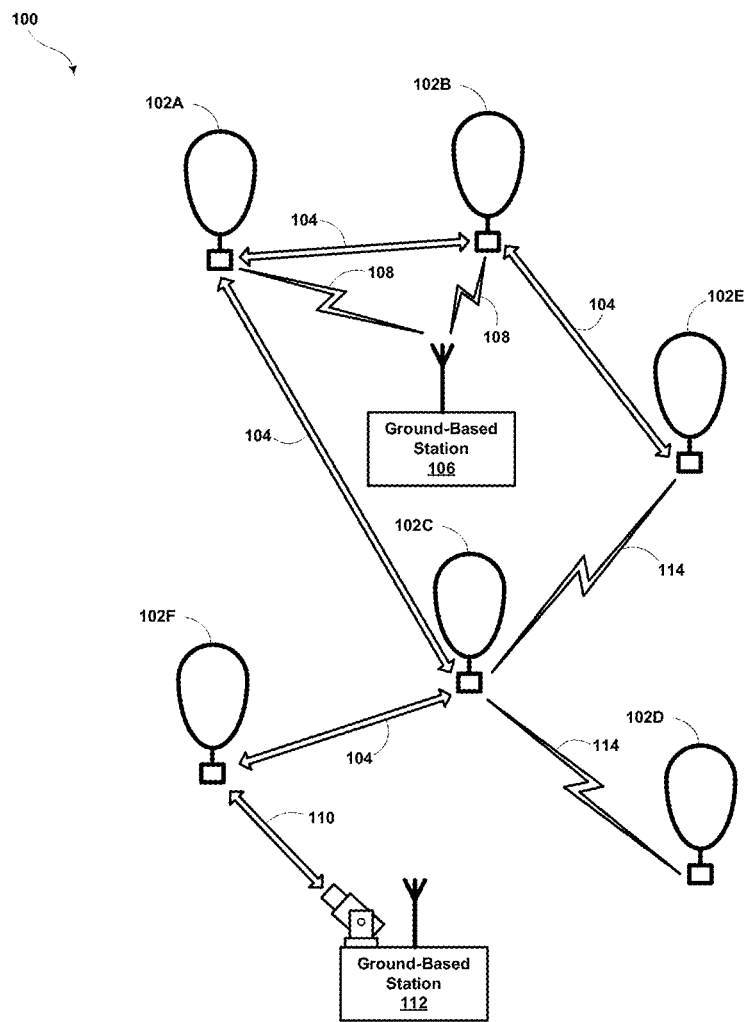
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments may be implemented in the context of a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

To function as a node in a balloon network, a balloon may consume a significant amount of power. However, increasing the amount of power supplied by a battery (e.g., a Lithium-ion battery) and/or the increasing the number of batteries on a balloon will typically increase the size and weight of the battery or batteries, which may be undesirable for various reasons. Accordingly, an example embodiment may include one or more altitude control mechanisms that also function as supplemental power systems, and generate power as part of the processes to increase or decrease the altitude of the balloon.

Example embodiments may include a high-altitude hot air balloon for long duration flight that uses solar greenhouse heating and a highly-reflective solar collector to power a heat engine. In accordance with example embodiments, a hot-air balloon can use solar greenhouse heating to heat the air within a transparent balloon envelope during the daytime, a hydrogen fuel cell as a power source to heat the air in the balloon during night-time, and a highly-reflective (e.g., metalized surface) solar collector to heat the hot side of a heat engine configured with its cold side thermally coupled with a water reservoir of the fuel cell.

In an example embodiment, a balloon system can include a transparent outer envelope that acts as a greenhouse, by allowing visible sunlight to pass through the surface of the envelope unimpeded, while trapping infrared (IR) radiation of heat within the envelope. As a result, the air within the envelope can be passively heated during daylight hours. When flying in the stratosphere, greenhouse heating can be sufficient to maintain buoyancy during the daytime, but without creating a heat differential of more than approximately 100 degrees with respect to the atmosphere outside the envelope. Such a relatively low temperature differential can help keep radiation losses at night at a fairly low level, but it can also present some practical challenges for implementing a heat engine. As described below, example embodiments described herein provide for overcoming these practical challenges.

The balloon system can also include an inner "bladder" housing a hydrogen fuel cell system. The hydrogen fuel cell system can be used for generating heat and/or power for heating the air within the balloon during times when solar energy is not available and/or natural cooling of the air within the balloon would otherwise result in greater than a desired and/or specified loss of buoyancy through cooling. The inner bladder can contain hydrogen gas to fuel the fuel cell, as well as an oxygen source. It can also include a reservoir for water that is produced in the process of electricity generation by the fuel cell.

Example embodiments of the balloon may include a heat engine for both generating additional electrical power for the balloon, and driving an electrolysis process for recharging the fuel cell. More specifically, the heat engine can be configured with its hot side below the fuel cell bladder and at the focus, or in the focal region, of a reflective solar collector situated beneath the bladder. The cold side of the heat engine can extend into, and be thermally coupled with, the water reservoir of the fuel cell by way of a heat exchanger. This configuration of the solar collector, the heat engine and the fuel cell can be made to operate as follows.

During the night-time, the fuel cell can generate electricity by converting hydrogen and oxygen into water, and creating an electrical current from the chemical reaction. The water can be collected and stored in the reservoir. The electrical energy generated can be used to run one or more heaters to heat the air inside the balloon, thereby maintaining a temperature and resulting buoyancy sufficient to keep the balloon in the stratosphere (e.g., at a specified altitude). The electrical energy can also be used to power one or more electrical devices carried on a balloon payload, for example.

During the daytime, greenhouse heating may be used to heat the air inside the balloon and maintain requisite buoyancy, as noted above. Also during the daytime, the reflective solar collector can be arranged to focus a significant amount of solar heat energy on the hot side of the heat engine. This heat can then be conducted to the cold side of the heat engine, which, as noted, is thermally coupled with the water reservoir of the fuel cell with a heat exchanger. The heat conducted through the heat exchanger can be made to cause the water to vaporize and then recondense on the inner wall of the bladder, releasing heat in the process. The heat released by the recondensation process can be thermally transferred across the bladder surface to the surrounding air within the outer envelope, thus providing additional heat source for the envelope air during the daytime. In this way, solar energy can enter the transparent balloon envelope as optical light, be captured and concentrated by the solar collector, converted to electrical energy by a heat engine, be transferred as excess heat to the water reservoir, and ultimately heat the air inside the balloon, and thereby drive greenhouse heating.

The temperature differential between the hot and cold sides of the heat engine can be used to run the heat engine to generate electricity. The generated electricity can then be used, in conjunction with the heating of the water, to drive an electrolysis process that dissociates the hydrogen and oxygen into $H_2$ and $O_2$, thereby resupplying the fuel cell with its operating fuel. Thus, the heat engine can function to recharge the fuel cell during the daytime. Electricity generated by the heat engine can also be used to recharge batteries of the balloon, and/or operate one or more electrical devices carried on a balloon payload.

The efficiency of heat engines is limited to the Carnot efficiency of $1-(T_{cold}/T_{hot})$, where $T_{cold}$ and $T_{hot}$ are the temperatures of the cold and hot sides of the heat engine, respectively. In practice a heat engine may be further limited to about 50% of the Carnot efficiency. Although the approximate heat differential of 100 degrees between the stratosphere outside (about 256 K) the balloon and the air inside the envelope (about 356 K) yields a Carnot efficiency of about 30%, there can be practical challenges to constructing a heat engine, such as a Stirling engine, that operates at a 100-degree differential. Accordingly, example embodiments provide for a much larger heat differential between the focus, or in the focal region, of a reflective solar collector and the water reservoir of the fuel cell.

In accordance with example embodiments, a heat engine can be configured to utilize this much larger heat differential, thereby overcoming practical challenges of a smaller heat differential, and enabling a range of practical and versatile designs. As described in more detail below, a heat differential of 400 K or more can be achievable using techniques disclosed herein.

In accordance with example embodiments, the solar collector can be made of a highly-reflective metalized layer on a light-weight material, and attached to the balloon system with an adjustable off-axis azimuth mounting for tracking the sun in altitude. The balloon can also be equipped with a reaction wheel, or other angular momentum device, for causing the balloon to be rotated about its vertical axis to track the sun in longitude. In this way, the solar collector can be maintained in an orientation that achieves a high degree of solar collection for most or all of the daylight hours, when the sun is above the local horizon of the balloon system.

In an example embodiment, the heat engine can be a Stirling engine, or other mechanical or thermo-mechanical heat engine. Alternatively, the heat engine can be a light-weight a thermo-acoustic heat engine. As a further alternative, the heat engine could take the form of a photo-voltaic device. The heat engine could be configured within a copper tube for efficient conduction of heat from the focal point or region of the solar collector, as well as efficient thermal coupling to the heat exchanger in the water reservoir.

In accordance with example embodiments, solar energy collected with the solar reflector may be concentrated in a focal region, or at a focal point (focus), depending on the geometric form of the collector. More particularly, a spherical reflector directs collected sunlight to a focal region along an axis of the spherical section. In another example embodiment, a parabolic reflector could be used. In this case, collected light would be directed to a focal point of the parabolic section.

2. Example Balloon Networks

In an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as back-haul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
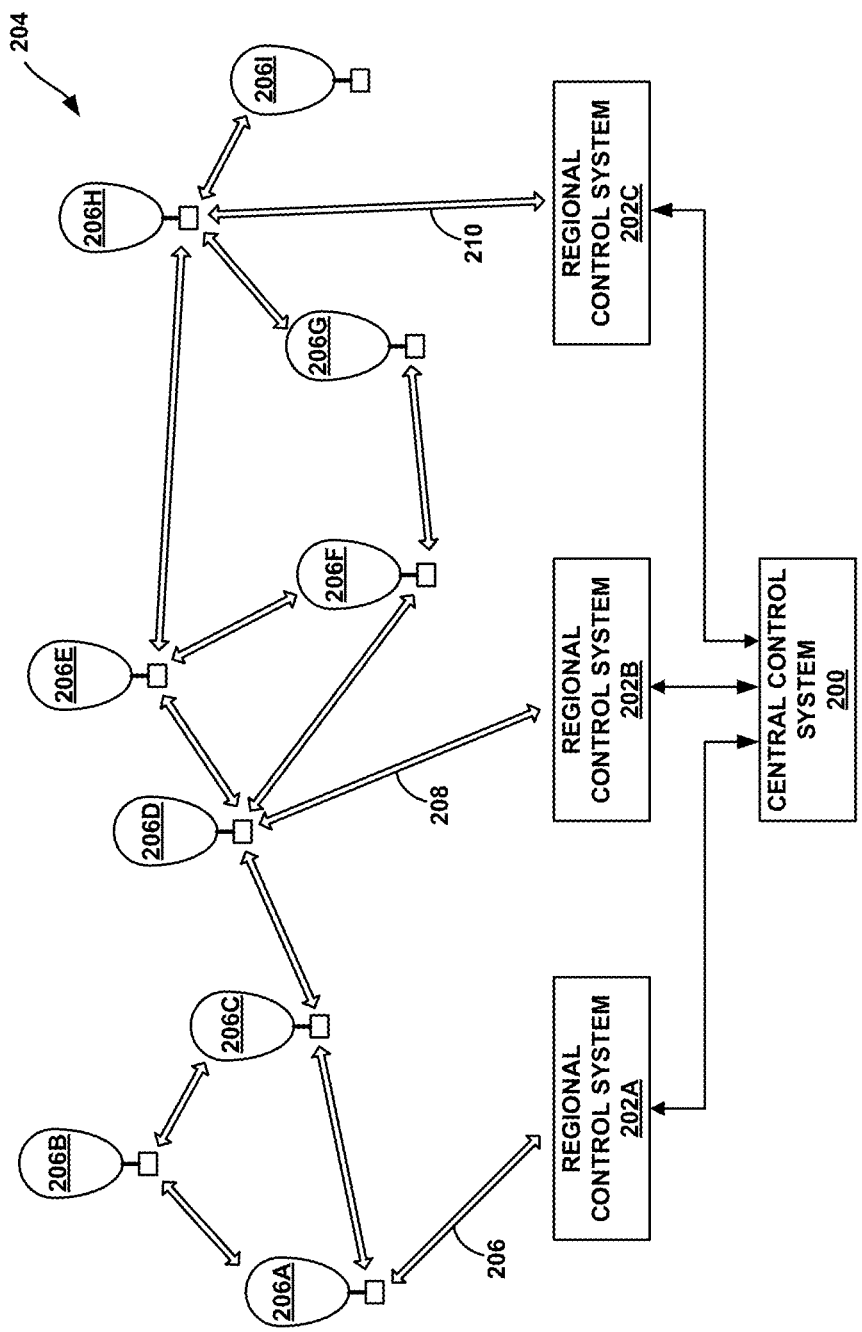
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
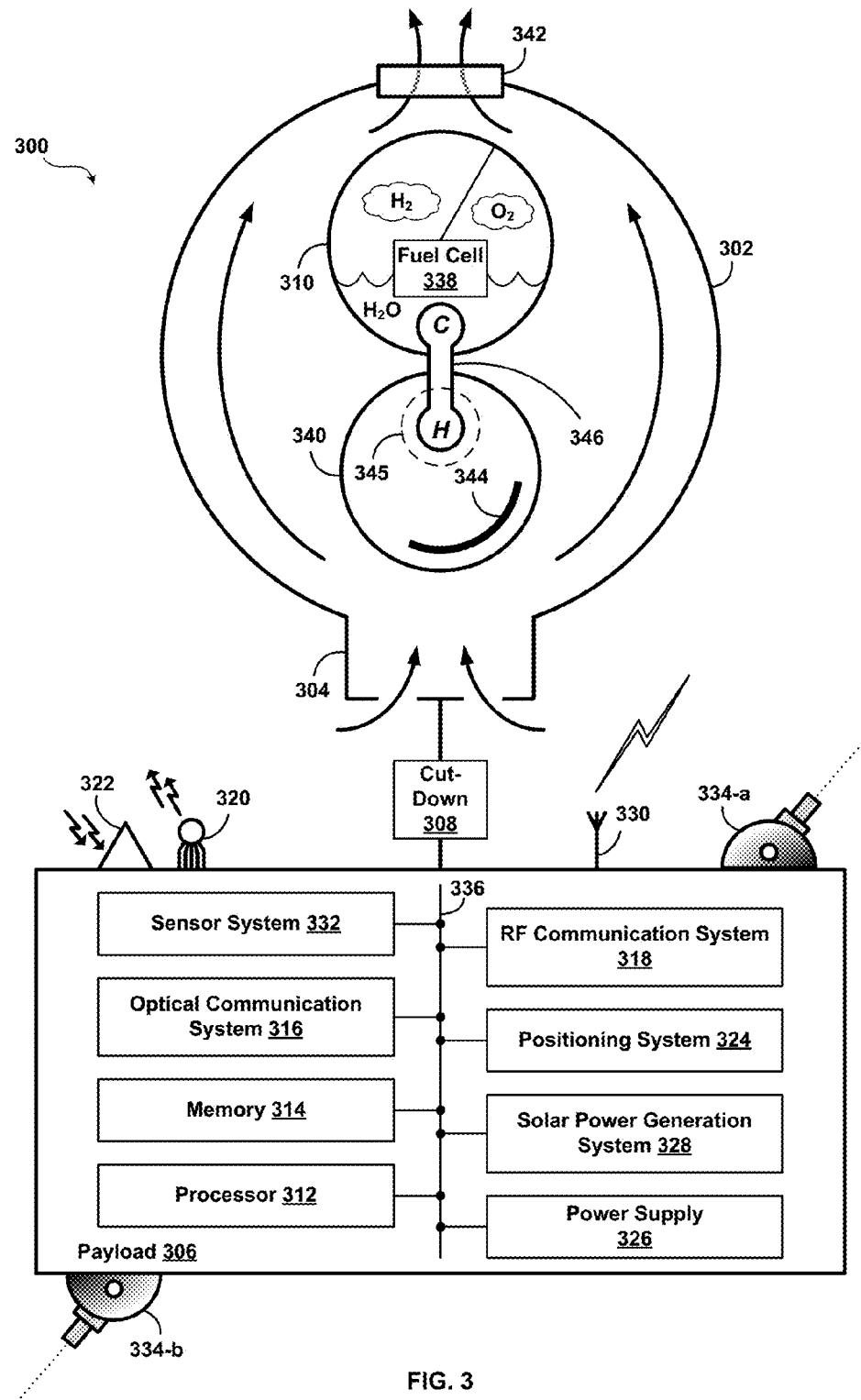
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon system 300, according to an example embodiment. As shown, the balloon system (or just "balloon") 300 includes an envelope 302, a skirt 304, a payload 306, and a cut-down system 308, which is attached between the skirt 304 and payload 306.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. The envelope 302 and/or skirt 304 could also be made of an inflatable membrane with a fixed or nearly fix maximum volume. In one example embodiment, the envelope and/or skirt could be made of metalized Mylar, BoPet, or polyethylene. Other materials are also possible. Further, the shape and size of the envelope 302 and skirt 304 may vary depending upon the particular implementation. Additionally, the envelope 302 may be filled with various different types of gases, such as helium and/or hydrogen and/or heated atmospheric air. Other types of gases are possible as well.

In accordance with example embodiments, the envelope 302 could be optically transparent, such that optical light can pass through the material of the envelope largely unattenuated. At the same time, the material of the envelope could be largely opaque to infrared radiation (IR). As described below, such an envelope, when inflated, could facilitate solar greenhouse heating of the gas (e.g., atmospheric air) within the envelope. The gas within the envelope 302 can thereby serve as lift gas for the balloon system 302, providing buoyancy to keep the balloon system aloft (e.g., "floating" or "flying") in the Earth's atmosphere.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 330.

The payload 306 may also include a power supply 326 to supply power to the various components of balloon 300. The power supply 326 could include a rechargeable battery. In other embodiments, the power supply 326 may additionally or alternatively represent other means known in the art for producing power.

In addition, the balloon 300 may include a solar power generation system 328. The solar power generation system 328 may include solar panels and could be used to generate power that charges and/or is distributed by power supply 326. The solar power generation system 328 could also include elements or components for enhancing the efficiency of passive absorption of radiant heat energy. Radiant heat could, in turn, be used for thermal functions or processes of the balloon, such as direct heating of the air in the envelope 302, recharging one or more fuel cells, and/or operating a heat engine (see below).

Further, payload 306 may include various types of other systems and sensors 332. For example, payload 306 may include one or more video and/or still cameras 334-a,b, a satellite positioning system, such a Global Positioning Satellite (GPS) GPS system, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information. Not all of the possible sensors and/or sensor components are necessarily shown in FIG. 3.

As noted, balloon 300 may include an ultra-bright LED system 320 for free-space optical communication with other balloons. As such, optical communication system 316 can be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. An example of how the optical communication system 316 and other associated components may be used is described in further detail below.

The balloon may also include a positioning system 324 for determining geographic position and orientation, as well as controlling and/or adjusting geographic position and orientation. The positioning system 324 could operate in cooperation with other systems and/or subsystems of the balloon, such as the sensor system 332 and/or a navigation system. In addition the positioning system 324 could include functionality to control balloon altitude by controlling and/or adjusting a variable buoyancy system of the balloon, as described in more detail below. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302. As with other aspects of position determination and/or control, the positioning system 324 could operate cooperatively with other systems and subsystems of the balloon to actuate buoyancy control.

The various components, systems, and subsystems of the balloon 300 may share one or more communicative connections and/or power-distribution connections. These are represented in FIG. 3 by a bus 336. It will be appreciated that not all connections are necessarily shown in FIG. 3, and that there could be additional and/or different ones as well.

Further, a balloon 306 may include a navigation system (not shown). The navigation system could operate in conjunction and/or cooperation with the positioning system 324 in order to implement station-keeping functions for maintaining position within and/or moving to a position in accordance with a desired topology. In particular, the navigation system may use altitudinal wind data to determine altitudinal adjustments that result in the wind carrying the balloon in a desired direction and/or to a desired location. The positioning system 324 could include or function with an altitude-control system for making adjustments to temperature and/or density of the air in the envelope 302 in connection with one or another of the techniques of variable buoyancy control described below. The temperature and/or density adjustments could, in turn, effectuate the determined altitudinal adjustments and cause the balloon to move laterally in the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

It should be understood that a balloon and/or components thereof may vary from the illustrated balloon 300. For example, some or all of the components of balloon 300 may be omitted. Components of balloon 300 could also be combined. Further, a balloon may include additional components in addition or in the alternative to the illustrated components of balloon 300. Other variations are also possible.

2e) Example Variable Buoyancy System and Power Generation

In accordance with example embodiments, a variable buoyancy system may include one more openings in the bottom of the envelope 302 for drawing in cool, ambient air from the atmosphere, and one or more openings in the top of the envelope 302 for venting hot air in the envelope out to the atmosphere. By controlling a balance between cool air being drawn into the envelope and hot air being vented out of the envelope, the temperature, and therefore the buoyancy, of the air in the envelope may be regulated.

Operation of buoyancy regulation, in accordance with example embodiments, is illustrated diagrammatically in terms of air flow into and out of the envelope 302 in FIG. 3. Two short curved arrows at the bottom of the envelope 302 represent cool atmospheric air drawn in through openings at the bottom of the skirt 304. Atmospheric air drawn into the envelope 302 is heated, either by solar greenhouse heating (during the daytime) or by the fuel cell (during the night-time), and can thereby provide at least a portion of the buoyancy for the balloon system 300. As such, atmospheric air can server as lift gas for the balloon system 300. As the temperature of the lift gas increases, its buoyancy, and by extension, that of the envelope 302 will tend to increase and the altitude of balloon system 300 will tend increase.

In order to reduce buoyancy in a controlled manner, for example in response to a determined need to slow, halt, or reverse the balloon system's ascent, lift gas within the envelope may be controllably released through the controllable vent 342. More particularly, as the lift gas is heated, it will tend to rise toward the top of the envelope 302 from where it can be vented. This flow toward the top is represented in FIG. 3 by two long arrows within the envelope 302. Two short arrows leading out of the top of the envelope 302 represent release of hot air out of the balloon through a controllable vent 342 at the top of the envelope 302. Venting (releasing) gas from the envelope 302 could be controlled by adjusting the size of the vent openings. Heating of the lift gas and controlled release of lift gas through the vent 342 can thereby provide basic operations of buoyancy regulation. More specifically, by balancing heating and venting of lift gas, a desired or required buoyancy may be achieved. The desired or required buoyancy may be determined by the positioning system 324, for example. It will be appreciated that the controllable vent 342 illustrated in FIG. 3 could also be implemented as more than one vent, and could be located at one or more locations in addition to or instead of the top of the envelope.

During night-time hours when negligible direct solar energy is available, natural cooling can typically dissipate the residual heat of the air inside the envelope 302, leading to a drop in buoyancy. To address night-time cooling, a heater can be use in order to keep the lift gas in the envelope 302 sufficiently heated during night-time hours. In accordance with example embodiments, one or more electric heaters can be employed for this purpose. By judiciously heating the air inside the envelope with one or more heaters, the temperature of the air in the balloon may again be regulated, and the buoyancy thereby again controlled.

In accordance with example embodiments, electricity (or other power) to operate one or more heaters can be generated by a fuel cell 338. Electricity supplied by the fuel cell 338 can also be used to operate one more electrical elements, components, and/or systems of the balloon system 300. For example, electricity from the fuel cell 338 could be used to operate components and systems of the payload 306 described above. Also as describe above, and as discussed in additional detail below, the balloon 300 could be part of a balloon-based data network. Beyond what might be characterized as basic data transport functions of switching and/or routing, a balloon-borne network could also include various enhanced types of data processing and services supported or delivered by servers and data centers, for instance.

In accordance example embodiments, the fuel cell 338 could be configured inside of a bladder 310 located within of the envelope 302, as illustrated in FIG. 3. In addition to housing the fuel cell 338, the bladder 310 could include one or more reservoirs or storage chambers to store the fuel for the fuel cell 338, as well as the exhaust product (by-product) of energy generation by the fuel cell 338. Because fuel cell operation generally produces heat as well as electrical energy, by locating the fuel cell 338 in a bladder 310 within the envelope 302, at least some of the heat produced can be readily available for heating the air inside the envelope 302. This, in turn, may reduce the amount of electrical power required for heating the air inside the envelope 302, thereby making at least some of the generated electrical power available for other functions of the balloon 330, such as operating electronics of the payload 306 and/or charging or more batteries, for example.

By way of example, the fuel cell 338 could be a hydrogen fuel cell. A hydrogen fuel cell can combine hydrogen and oxygen to produce water in a chemical process that also generates an electric current, as well as heat. The hydrogen (and oxygen) may be considered the fuel, and the water may be considered the exhaust or by-product. Storing the water, for example in a reservoir within the bladder 310, and can make it available for a reverse process in which energy is supplied to convert the water back into hydrogen and oxygen. For example, sunlight during the daytime can be used to drive a photo-catalytic water splitting process. Additionally or alternatively, excess solar heating—i.e., beyond what is sufficient to heat the air in the envelope for buoyancy purposes— may also be available for splitting the water into hydrogen and oxygen, as noted below. Other techniques for electrolysis are also possible as well, such as using electricity generated by a heat engine, as described below. Running a hydrogen fuel cell in reverse to recover hydrogen and oxygen from water allows the hydrogen fuel cell to be used as a renewable energy source. The bladder 310 in FIG. 3 is represented as containing hydrogen gas and oxygen gas ($H_2$ and $O_2$), as well as water ($H_2O$) in a water reservoir depicted at the bottom of the bladder. Thus, the fuel cell 338 may be considered a hydrogen fuel cell, at least for purposes of illustration.

In accordance with example embodiments, the balloon system 300 could include a heat engine 346 for generating electricity (or other form of energy) that can be used to recharge the fuel cell 338. The heat engine 346 can be made to generate electrical power by deriving energy from at least a portion of heat transferred from a hot side to a cold side of the heat engine, or by conversion of sunlight at the hot side into electrical energy, accompanied by heat transfer to the cold for discarding excess heat. By way of example the heat engine 346 could be a Stirling engine. However, other types of heat engine could be used as well. Without limitation, other examples include acoustic heat engines and photo-voltaic solar cells. Electricity generated by the heat engine 346 can also be used as a primary or supplemental power supply for operating other electrical components and devices of the balloon system 300.

In further accordance with example embodiments, the balloon system 300 can also include a highly reflective solar collector 344 for heating the hot side of the heat engine 346 during daytime. More particularly, the reflective solar collector 344 can be located within a containment vessel 340 below the bladder 310, and can be configured to collect and concentrate solar energy (e.g., sunlight) in a focal region 345 situated between the reflective solar collector 344 below and the bladder 310 above, as shown in FIG. 3. Depending on the geometric shape the reflective solar collector 344, the focal region 345 could be focal point (focus) or a line, area, or volume. During daylight hours, the reflective solar collector 344 can be made to track the sun and concentrate solar energy within the focal region by a concentration factor of 100 to 1,000 or greater.

In accordance with example embodiments, the heat engine 346 can be configured with its hot side (labeled "H" in FIG. 3) in the focal region and its cold side (labeled "C" in FIG. 3) in the water reservoir of the fuel cell 338. By placing the hot side of the heat engine 346 in the focal region 345, the hot side can be maintained at a temperature of approximately 700 K to 1,000 K or greater during daylight hours. By thermally coupling the cold side with water in the water reservoir, the cold side can be maintained at a temperature of approximately 300 K. A resulting heat differential between the hot and cold sides of the heat engine 346 can thereby be made sufficiently large to yield a high thermodynamic efficiency for conversion of heat to usable energy by the heat engine 346. An illustrative estimate of thermodynamic efficiency and the amount of energy available for extraction by a heat engine 346 is presented below.

By using solar energy as a heat source for the heat engine 346 during the daytime (as well as for greenhouse heating of the lift gas in the envelop 302), and using at least a portion of the power generated by the heat engine 346 to run the fuel cell 338 in reverse (i.e., recharge), the fuel cell 338 can be made to serve as a renewable energy source for night-time heating (among other possible uses). In this way, example embodiments, such as the balloon system 300, can enable very long duration, high-altitude flight: using unimpeded sunlight for solar energy during daytime, and a nearly perpetually renewable fuel cell for heating during the night-time.

Figure 4:
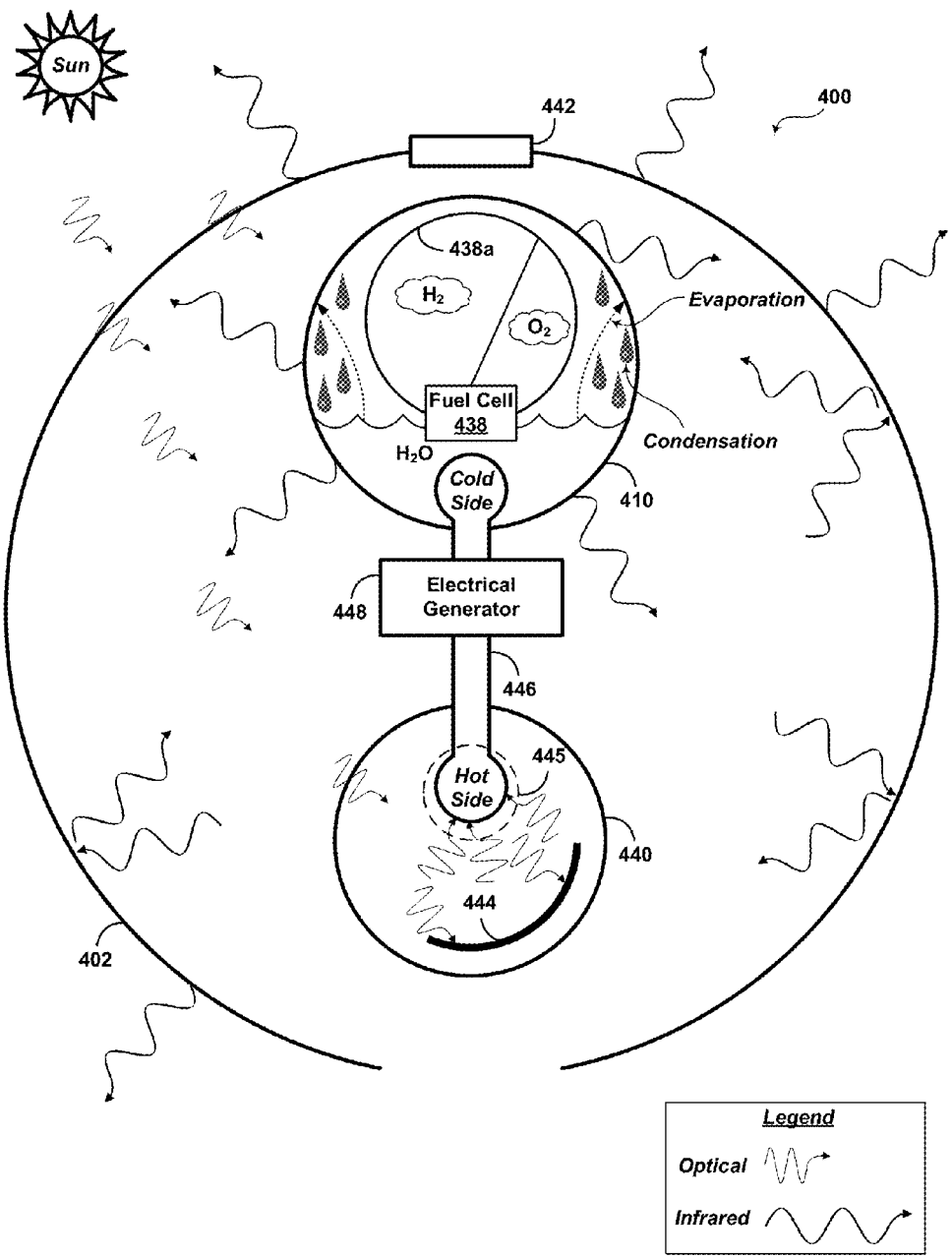
FIG. 4 is a simplified block diagram illustrating a high-altitude balloon, and certain aspects of its operation relating to buoyancy regulation, according to an example embodiment.

FIG. 4 is a conceptual illustration of certain aspects of buoyancy regulation and energy generation in a balloon system 400. For brevity in the FIG. 4, depiction of a payload is omitted, and an envelope 402 is shown without a skirt. The envelope 402 has an opening at the bottom through which atmospheric air can be drawn in, and a controllable vent 442 at the top through which hot lift gas can be controllably released as necessary, as described above.

A cartoon representation of the sun is shown in the upper left of FIG. 4. Optical light from the sun, represented as short, wavy arrows, is depicted as entering the envelope 402 through the envelope's optically-transparent skin. Within the envelope, IR radiation, represented as long, wavy arrows, is depicted as being trapped as it "bounces" off the inside wall of envelopes IR-opaque skin (the "bouncing" is intended to signify trapping of IR radiation within the envelope 402, and not necessarily IR reflectivity as the depiction might be interpreted to imply). Together, the transparency to optical radiation and trapping of IR radiation can give rise to solar greenhouse heating of the lift gas in the envelope 402 during daylight hours when sun is above the balloon's local horizon. A legend in the lower right side of FIG. 4 shows the wavy-line symbols representing optical and IR radiation.

In accordance with example embodiments, a reflective solar collector 444 is configured in a lower, interior portion of the envelope 402. The solar collector 444 can be situated within an optically transparent containment vessel 440. As depicted in FIG. 4, optical sunlight can pass unimpeded (though not necessarily 100% unattenuated) through both the envelope 402 and the containment vessel 440, where it reaches the reflective surface of the solar collector 440 and is reflected toward a focal region 445. The solar collector 444 can thereby concentrate the reflected solar radiation in the focal region 445 by a concentration factor in an approximate range of 100 to 1,000 or greater, for example. The optically transparent containment vessel 440 can also facilitate greenhouse heating of its interior, in a similar manner to the envelope 402.

Also in accordance with example embodiments, the balloon system 400 includes a fuel cell 438 within a bladder 410 in an upper, interior portion of the envelope 402, above the containment vessel 440 and the solar collector 444 therein. The bladder 410 includes a water reservoir (labeled "$H_2O$") depicted in a bottom portion of the bladder and under the fuel cell 438. The bladder also includes an inner chamber 438a for holding a supply of hydrogen gas ($H_2$) and oxygen gas ($O_2$). When the fuel cell is operated to generate electricity, $H_2$ and $O_2$ are combined in a chemical process that creates an electric current and produces water. The water can be collected and stored in the reservoir. The fuel cell can be recharged by dissociating $H_2O$ into $H_2$ and $O_2$, and returning the recovered $H_2$ and $O_2$ to their respective supplies in the inner chamber 438a. By way of example, the process of dissociation can be electrolysis, in which electrical energy is used to separate $H_2O$ into its constituent chemical elements. As described above and discussed further below, the electrical energy for electrolysis can be generated by a heat engine.

As shown in FIG. 4, and in accordance with example embodiments, the balloon system 400 includes a heat engine 446 configured with its hot side (as labeled) in the focal region 445 of the solar collector 444 and its cold side (as labeled) in the water reservoir of the fuel cell 438 in the bladder 410. The hot and cold sides are connected by a heat exchanger, which can be a heat-conducting component, such as a copper tube or rod, or a multi-component structure or device. The heat engine 446 can generate power by transfer of heat from its hot side to its cold side. An electrical generator 448 shown as part of the heat engine 446 in FIG. 4 represents a component of the heat engine that can convert heat into electrical energy, and then supply generated electricity to one or more components and/or electrical devices of the balloon system 400.

By way of example, the heat engine 446 could be a Stirling engine. In accordance with example embodiments, a Stirling engine 404 may be configured to extract heat energy from the concentrated solar energy in the focal region 445, and convert a portion of the extracted heat energy to mechanical energy in cyclic process of thermodynamic expansion and compression of a "working fluid" (not shown) within the engine. Mechanical energy may be derived from a coupling of movement of the working fluid back and forth between the hot and cold sides to motion of one or more pistons (not shown) on each of the hot and cold sides. Motion of the pistons could, in turn, cause rotation of a crank shaft (not shown) and creation of rotational energy. The movement of the working fluid between the hot and cold sides of the Stirling engine results in a net transport of heat from the hot to the cold side. The working fluid can be a gas, such as air, or some other suitable gaseous or fluid substance.

In accordance with example embodiments, the electrical generator 448 can be coupled with the Stirling engine to convert the mechanical energy of the Stirling engine to electricity. For example, a rotating crank shaft could mechanically power the generator 448. The generated electricity may then be used to power one or more electrical components of the balloon system 400 and/or charge one or more batteries.

In further accordance with example embodiments, the cold side of the heat engine 446 can be thermally couple with the water in order to facilitate efficient transfer of heat out of the heat engine and into the water reservoir. For example, the cold side of the heat engine can include heat-conducting cooling fins. Other forms of thermal coupling can be used as well. Heat transferred from the hot side to the cold side of the heat engine 446 can be deposited in the water and account for disposal of excess heat from the heat engine, and can thereby cause the water temperature to rise. In particular, at atmospheric pressure in the stratosphere (about 5 kPascals), water boils at approximately 306 K. Consequently, heat deposited in the water from the cold side of the heat engine 446 can cause the water temperature to rise sufficiently to vaporize at least a portion of the water in the reservoir. Two dashed, arced arrows within the bladder 410 in FIG. 4 represent water evaporation (as labeled) due to heat transfer from the cold side of the heat engine 446 to the water. This vaporization can account for dispersion of disposed excess heat from the heat engine.

As vaporized water rises within the bladder 410 and comes in contact with inner wall of the bladder, it can cool, recondense into liquid water, and return to the water reservoir. More particularly, the temperature within the bladder 410 can exceed that of the lift gas surrounding the bladder in the envelope 410. Consequently, the skin of the bladder 410 can be sufficiently cooler than the water vapor within the bladder to cause the water vapor to recondense. In the process, additional heat will be transferred across the skin of the bladder from the recondensing water vapor, and into the lift gas. Condensing water vapor is depicted in FIG. 4 by a cartoon representation of water droplets (identified as "Condensation") within the bladder 410. Heat transfer across the skin of the bladder can raise the temperature of the outer skin surface, which can then transfer the heat into the lift gas in the form of IR radiation. This process is represented in FIG. 4 by the IR waves (long wavy arrows) directed away from the outer surface of the bladder 410.

Thus, the optical solar energy captured and concentrated by the solar collector 444 can serve as a primary source of greenhouse heating of the lift gas by way of IR radiative heat transfer from the outer surface of the bladder 410. In between the process of capture and concentration of the optical solar energy by the solar collector 444 and IR radiative heating of the lift gas, one portion of the capture solar energy is used to drive the heat engine 446, and another portion (excess from the heat engine 446) is used to vaporize the water in the reservoir. The cooling and recondensing of the vaporized water ultimately returns a portion of the vaporization energy to the lift gas, and the opacity of the balloon envelope to IR radiation traps the heat of the lift gas thereby resulting in the greenhouse heating.

A Stirling engine is an example of a thermo-mechanical heat engine. Other types of thermo-mechanical heat engines could be used in the balloon system 400. Alternatively, the heat engine can be a light-weight, thermo-acoustic heat engine. As further alternative configuration, solar energy concentrated in the focal region 445 can be converted into electrical energy using photo-voltaic cells (e.g., "solar cells") capable of directly converting sunlight into electricity. In this case, concentration of optical sunlight can be directly harnessed for high-yield of electrical conversion, and the high heat in and around the focal region 445 might then mostly constitute excess (heat) energy that needs to be disposed of or discarded. In the present context, a photo-voltaic device can still, however, also be considered a heat engine since the solar collector 444 concentrates heat by concentrating the sunlight that is converted to electricity by the photo-voltaic device. Such a photo-voltaic device can be used instead of (or in addition to) a thermo-mechanical and/or thermo-acoustic heat engine. As with a thermo-mechanical or thermo-acoustic heat engine, the excess heat from a photo-voltaic device can be transferred from the focal region 445 into the water reservoir of the fuel cell 438 with a heat-conducting component, such as a copper tube. Again, heat transferred to the water can drive evaporation, which can then yield additional heating of the lift gas as the water vapor condenses on the inner wall of the bladder 410 and, in the process, transfers heat across the wall and into the envelope 402.

An order-of-magnitude estimate of available solar energy, balloon size, and solar collector size may serve as a rough calibration of the amount of solar power that might be harnessed by a high-altitude balloon. The measure of solar radiation received per unit surface area per unit time at given position is customarily called "insolation" (and sometimes also called "solar irradiation"), and referred to herein as $I_{sol}$. At altitudes characteristic of the stratosphere, $I_{sol}$ peaks during the daytime as high as about $I_{sol}=1,360$ Watts per square meter (Wm), typically averaging around a level, referred to herein as $I_{av}$, of $I_{av}=1,000$ Wm$^{-2}$ over the course of the day, as the sun's elevation with respect to the horizon changes. Because cloud cover is absent in the stratosphere and atmospheric absorption and/or attenuation over most of the solar spectrum are almost negligible, attenuation is significant only when the sun is at low elevations (e.g., sunrise and sunset), or during the winter at polar latitudes. Consequently, nearly all of the 1,000 Wm$^{-2}$ average insolation could irradiate a balloon flying in the stratosphere over the course of a given day. For purposes of illustration and by way of example, the following discussion is made with reference to FIG. 4.

As an example, a spherical balloon envelope 402 with radius of 10 meters (20 meter diameter) will have a (circular) cross-sectional area, $A_{bal}$, of roughly $A_{bal}=314$ m$^2$. Assuming, also by way of example, an absorptivity of $\alpha_{skin}=0.01$ (0.1%) for a transparent balloon skin, an average total amount of power for solar heating due just to absorption, $P_{solar}$, can be estimated as $P_{solar}=I_{av} \times A_{bal} \times \alpha_{skin} \approx 3.14$ kilowatts (kW). At the same time, insolation passing through the transparent balloon envelope 402 will be attenuated by $\alpha_{skin}=0.01$, so that attenuated solar irradiance, $I_\alpha$, within the balloon volume becomes $I_\alpha = \alpha_{skin} \times I_{av} = 990$ Wm$^{-2}$. In the absence of a solar collector 444, the insolation largely can pass through the transparent envelope 402 without significantly heating the air inside. By including the solar collector 444, in accordance with example embodiments, a much larger amount of the incident solar energy can be captured and converted to usable energy (e.g., by a heat engine 446), as well as be an energy source for greenhouse heating of the air inside the balloon envelope 402.

As a further aspect of the present illustrative example, a solar collector 444 with a cross-sectional area, $A_{col}$, of 20% of that of the balloon envelope 402, or $A_{col} \approx 63$ m$^2$, can be considered. More particularly, over the course of daylight hours (or while the sun is a threshold elevation above the local horizon of the balloon system 400), the solar collector 444 can, in accordance with example embodiments, be made to track the sun such that it presents its area of approximately 63 m$^2$ to the attenuated solar irradiance $I_\alpha$ throughout the daylight hours. Assuming, again as an example, that the solar collector 444 has an a reflectivity $\gamma = 0.7$, such that 70% of the attenuated irradiance is reflected (concentrated) into the focal region 445, a total amount of concentrated solar power, $P_{con}$, captured by the collector 444 and concentrated in the focal region 445 for harvesting as heat and converted energy (e.g., converted by the heat engine 446) will then be $P_{con} = \gamma \times A_{col} \times I_\alpha \approx 43.5$ kW.

An average temperature of the hot side of the heat engine 446 in the focal region 445 can be estimated by assuming the hot side to be in radiative equilibrium. Making additional illustrative assumptions that a collector concentration factor can be quantified as a characteristic area $A_{focal}$ of the focal region 445, that a fraction $\eta_{focal}$ of $P_{con}$ is available for heating the hot side, and that the hot side has a thermal emissivity $\epsilon_H$, the temperature of the hot side, $T_{hot}$, can be estimated using the Stefan-Boltzmann law and accounting for the average atmospheric temperature in the stratosphere, $T_{av}$. More particularly, defining $P_{hot} = \eta_{focal} \times P_{con}$ as the power available to heat the hot side of the heat engine 446, the temperature of the hot side can be estimated from $$T_{hot}^4 = \frac{P_{hot}}{A_{focal} \sigma \epsilon_H} + T_{av}^4,$$

where $\sigma = 5.67 \times 10^{-8}$ Wm$^{-2}$ K$^{-4}$ is the Stefan-Boltzmann constant. Taking as examples $A_{focal}=1$ m$^2$ (or a collector concentration factor of 63), $\eta_{focal}=0.8$, and $\epsilon_H=0.99$, and approximating $T_{av}$ as an average of mean daytime and night time temperatures, or $T_{av} \approx (250\text{ K}+4\text{ K})/2=127$ K, the estimated hot-side temperature can then be calculated from the above expression of the Stefan-Boltzmann law as $T_{hot} \approx 887$ K.

Energy generation by a heat engine 446 can be estimated as follows. The efficiency of heat engines is limited by the "Carnot efficiency" $\eta_{Carnot}=1-(T_{cold}/T_{hot})$, where $T_{cold}$ and $T_{hot}$ are the temperatures of the cold and hot sides of the heat engine, respectively. With the cold side of the heat engine situated in the water reservoir of the bladder 410, the cold-side temperature can be estimated to be that of the boiling point of water at an atmospheric pressure of 5 k Pascals, roughly characteristic of the stratosphere. From this assumption, it can be estimated that $T_{cold} \approx 306$ K. For the example under discussion, it therefore follows that $\eta_{Carnot} \approx 0.65$ (65%).

For reasons relating to various practical considerations of implementation, a heat engine may be further limited to about 50% or less of the Carnot efficiency. As a reasonable conservative estimate of the heat engine efficiency, $\eta_H$, for the present illustration is therefore taken to be $\eta_H \approx 0.3$ or 30%. The amount of power output by the heat engine can then be estimate as $P_{out} \approx \eta_H \times P_{hot} = 10.4$ kW. This can be more than sufficient to power typical components of a balloon system, such as balloon system 300 of FIG. 3, for example.

The remaining fraction of $P_{con}$—i.e., that not converted to $P_{out}$ by the heat engine 446—can ultimately be an energy source for heating of lift gas in the balloon envelope 402. An estimate of radiative heat available for heating of the lift gas can be derived as follows. From the discussion above, one amount of power, $P_{ex}=(1-\eta_{focal}) \times P_{con}$, does not heat the hot side of the heat engine, and another amount of power, $P_{cold}=(1-\eta_H) \times P_{hot}$, is transferred to the cold side of the heat engine as "waste heat" that is not converted to usable energy (e.g., electricity). It may therefore reasonably be assumed that $P_g = P_{ex} + P_{cold}$ is the available amount of $P_{con}$ for greenhouse heating of the lift gas in the balloon envelope 402. With some simple rearranging, $P_g = (1-\eta_{focal}\eta_H) \times P_{con}$.

The total amount of solar power available for greenhouse heating can then be estimated as $P_{g,total} = P_g + P_{sol}$, where, again, $P_{sol}$ accounts for direct solar heating, as described above. A small portion of the heat generated by $P_{g,total}$ will be dissipated in the atmosphere surrounding the balloon envelope 402 by convection. The remaining portion can be estimated by again assuming radiative equilibrium and applying the Stefan-Boltzmann law. Assuming a coefficient of convective heat loss $\beta$, and a thermal emissivity of the balloon envelope skin $\epsilon_{skin}$, the temperature $T_{rad}$ due to $P_{g,total}$ can then be estimated from $$T_{rad}^4 = \frac{(1-\beta)P_{g,total}}{A_{bal} \sigma \epsilon_{skin}} + T_{av}^4,$$

where, again, $\sigma$ is the Stefan-Boltzmann constant, $A_{bal}$ is the cross-sectional area of the balloon envelope 402, and $T_{av}$ is the average atmospheric temperature in the stratosphere. Taking as examples $\beta = 0.2$, and $\epsilon_{skin}=0.016$, and again using $A_{bal}=314$ m$^2$ and $T_{av} \approx 127$ K, the estimated temperature inside the balloon envelope 402 due to radiative heating can then be calculated as $T_{rad} \approx 565$ K.

As the preceding example illustration shows, there can be sufficient solar energy intercepted by the solar collector for effective radiative heating of the lift gas within the balloon envelope. The actual amount of heating of the lift gas in practice can depend on specifics of a given implementation. For example, a higher temperature might be expected if a larger solar collector (i.e., $A_{col}$) is used, and vice versa. In accordance with example embodiments, the temperature of the lift gas can be further regulated by selectively venting hot lift gas out through the vents 442 at the top of the balloon envelope 402, as described above.

It will be appreciated that the example above serves as an illustration, and is not intended to limit the scope of example embodiments. For example, other values of various variables and/or parameters of the example, such as $A_{bal}$, $A_{col}$, $A_{focal}$, $\eta_{focal}$, and $\gamma$, among others, can be used, and the particular derived quantities could correspondingly differ from those above. Furthermore, some of the variables and/or parameters can be me selected as a matter of design in order to achieve one or another specific result or outcome for an example embodiment. It will also be appreciated that some the assumptions made in the illustration can be revised or adjusted, and possibly yield different results. Such variations are within the scope of example embodiments.

The solar collector, such as solar collector 444, can be formed with various shapes suitable for, or capable of, collecting incident light and reflecting it to focal point or focal region. For example, the solar collector can be a spheroidal section or an axially-symmetric paraboloidal section. A spheroidal section reflector directs collected sunlight to a focal region along an axis of the spherical section. An axially-symmetric paraboloidal section directs collected sunlight to a focal point (focus) along the axis of the paraboloidal section.

In accordance with example embodiments, the solar collector can be made of a highly-reflective metalized layer on a light-weight material, and mounted off-axis, such that it can track the sun in both azimuth and elevation. For example, a solar collector could be made of metalized mylar or polyethylene. The balloon can also be equipped with a reaction wheel, or other angular momentum device, for causing the balloon to be rotated to track the sun. In this way, the solar reflector can be maintained in an orientation that achieves a high degree of solar collection for most or all of the daylight hours.

More particularly, calculations using a solar ephemeris can be used to determine the position of the sun in the sky at any given time. The sun's position in the sky can then be translated to a pointing direction with respect to the balloon system's location at the given time, determined, for example, by a GPS system. For example, the balloon system's location at the given time can be specified in terms of the geographic (or geodetic) latitude, longitude, and altitude, and the pointing direction to the sun can be specified as a local azimuth angle with respect to the balloon system's vertical direction and a local elevation angle with respect to the balloon system's local horizon. The solar collector can thus be made to track the sun by adjusting the azimuth and elevation angle of the solar collector as a function of time according to pointing calculations. Pointing calculations could be carried out by one or more processors on the balloon payload, and/or by one or more remote (e.g., ground-based) processors that provide calculated pointing parameters for upload to the balloon system. The balloon system can use the calculated pointing parameters to make adjustments to the orientation of the solar collector in order to cause the solar reflector to track the sun across the sky as function of time. Referring again to FIG. 3 momentarily, the positioning system 324 could use the calculated pointing parameters as input to control the orientation of the solar collector 344, for example.

Figure 5:
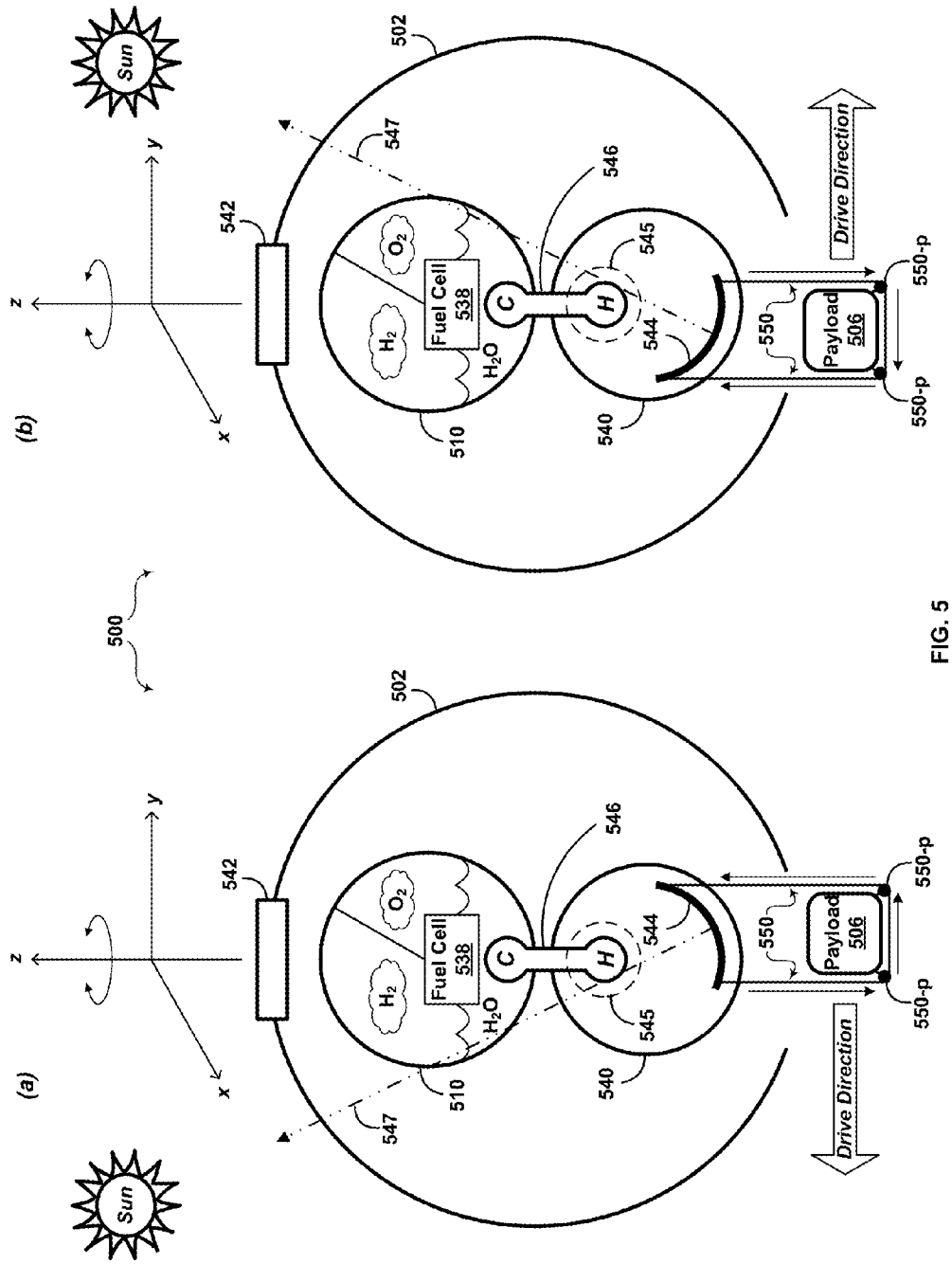
FIG. 5 is a simplified block diagram illustrating a high-altitude balloon, and certain aspects of its operation relating to orientation, according to an example embodiment.

FIG. 5 illustrates operation of an example collector orientation technique in an example balloon system 500 for causing a solar collector 544 to track the sun across the sky during daytime hours. The balloon system 500, depicted with two different orientations of the solar collector 544 for two different sky locations of the sun, includes an envelope 502, a bladder 510 containing a fuel cell 538, a heat engine 546, and a containment vessel 540 containing the solar reflector 544 having a focal region 545. For purposes of illustration, just two different orientations of the solar collector 544 are shown in panels labeled "(a)" and "(b)" in FIG. 5. The solar collector has an elevation axis 547 depicted as pointing toward the sun's elevation in each of panel (a) and panel (b). For brevity in FIG. 5, the envelope 502 is again shown without a skirt.

In accordance with example embodiments, a payload 506 is physically connected by one or more cables of a pulley system 550 to the solar collector 544 at two ends on opposite sides of an intersection of the elevation axis 547 with the solar collector. With this arrangement, the elevation angle of the solar collector can be adjusted as the payload 506 travels back-and-forth horizontally along the cables of the pulley system 550. Comparison of panels (a) and (b) in FIG. 5 shows by way of example how this elevation angle adjustment can be made to work. For purposes of the explanation, each of panels (a) and (b) is assumed to display a view of the balloon system 500 in the rotational plane of the elevation angle. With this assumption, the terms "left," "right," and "back-and-forth" describe horizontal directions in the rotational plane.

In an example configuration, the payload 506 has two pulleys 506-$p$, one at each of its two bottom corners (as viewed in the rotational plane of the elevation angle). The two pulleys can be configured to ride along the cables, which act as a sort of track. As the payload 506 travels back-and-forth horizontally along the cables, the lengths of the respective cable segments connecting the payload 506 to each of the two ends of the solar collector 544 adjust in opposite fashion, causing the solar collector to pivot in elevation angle. More specifically, in panel (a) the payload 506 is depicted as traveling to the left (as indicated by a leftward-pointing broad arrow labeled "Drive Direction"), causing the cable segment on the left to shorten, and thereby pulling the left side of the solar collector 544 downward. At the same time, and in complementary fashion, the cable segment on the right tends to lengthen, thereby releasing tension on the right side of the solar collector 544, which rises while taking up slack of the lengthening segment. This adjustment causes the solar collector to pivot to a lower elevation on the left side.

A similar description applies to panel (b). Specifically, in panel (b) the payload 506 is depicted as traveling to the right (as indicated by a rightward-pointing broad arrow labeled "Drive Direction"), causing the cable segment on the right to shorten, and thereby pulling the right side of the solar collector 544 downward. At the same time, and in complementary fashion, the cable segment on the left tends to lengthen, thereby releasing tension on the left side of the solar collector 544, which rises while taking up slack of the lengthening segment. This adjustment causes the solar collector to pivot to a lower elevation on the right side.

By suitably mounting the solar collector 544 in the balloon system 500, the elevation angle adjustment can be made to pivot in a manner that keeps the focal region 545 coincident with the hot side of the heat engine 546, even as the elevation angle of the solar collector 544 is adjusted to track the elevation angle of the sun. Although details of such a mechanical mounting configuration are not necessarily shown in FIG. 5, it will be appreciated that such a mechanical mounting configuration could be devised so as to incorporate the basic operational principles of the pulley system 550 as described above. Similarly, while details of how the payload 506 may be driven back-and-forth horizontally along the cables are not necessarily shown in FIG. 5, it will be appreciated that various techniques could be used. For example, back-and-forth motion of the payload 506 could be motor-driven by an electric motor. Furthermore, although the illustration in FIG. 5 appears to include just two pulleys 502-$p$ shown to ride on one cable span that includes two vertical segments and one horizontal segment, the pulley system 550 could be implemented with more than one pair of pulleys and more than one cable span.

In addition to tracking the sun's elevation angle as a function of time, the solar collector 544 can also be made to track the sun's azimuthal angle as a function of time. For purposes of illustration, panels (a) and (b) in FIG. 5 both display a reference Cartesian coordinate system with axes labeled x, y, and z. The z-axis corresponds to the vertical direction of the balloon system 500, and the arced arrow partially encircling the z-axis indicates rotation about in azimuthal angle about the z-axis.

In accordance with example embodiments, the azimuthal angle of the solar collector 544 can be adjusted using a reaction wheel. In one example configuration, the solar collector 544 can be mounted in the balloon system 500 such that its vertical axis is rotationally fixed with respect to that of the balloon system's vertical axis. The azimuthal angle of the solar collector 544 can then be adjusted by adjusting azimuthal angle of the balloon system 500 about its vertical axis. Although not necessarily depicted in FIG. 5, a reaction wheel can include a wheel or disk having a rotational axis aligned with the vertical axis of the balloon system 500. The reaction wheel can be made to rotate in a controlled manner, for example by way of an electric motor, thereby causing the balloon system 500, and with it the solar collector 544, to rotate in the opposite direction. Specifically, rotation of the wheel in a given direction will result an oppositely directed rotational force (i.e., angular momentum) about the balloon system's vertical axis. As a result, the balloon system will tend to rotate in the opposite direction of the reaction wheel by an amount and at a rate that depends on the angular momentum generated by the rotation of the reaction wheel and the rotational inertia of the balloon system 500.

In another example configuration, the solar collector 544 can be mounted in the balloon system 500 such that its vertical axis can rotate freely with respect to that of the balloon system's vertical axis. For this configuration, the reaction wheel can be connected with the mounting mechanism of the solar collector 544, such that rotation of the reaction wheel will tend to cause oppositely-directed rotation of the solar collector about its vertical axis, without necessarily applying any rotation force the rest of the balloon system 500 (except possibly the payload 506, assuming the payload to be connected in common with the solar collector 544, as described above). In this case, the solar collector 544 will rotate in the opposite direction of the reaction wheel by an amount and at a rate that depends on the angular momentum generated by the rotation of the reaction wheel and the rotational inertia of the solar collector 544.

For both example configurations, the sun's azimuthal angle, calculated as a function of time as described above, can be used to control the rotation of the reaction wheel, and thereby the azimuthal angle of the solar collector 544. Control of both the elevation angle adjustment and the azimuthal angle adjustment could be carried out by the positioning system 324, as described above. It will be appreciated that other techniques could be used to cause the solar collector 544 to track the sun across sky as a function of time, and do so in a manner that maintains positional coincidence of the focal region 545 with the hot side of the heat engine 546.

As the orientation of the solar collector 544 is adjusted to track the sun, it can happen that the bladder 510 may partially or fully cross the line of sight between the solar collector 544 and the sun. In accordance with example embodiments, the bladder 510 can be made of an optically transparent material so that when this line-of-sight traversal occurs, the bladder 510 does not block sunlight from illuminating the solar collector 544.

As discussed above in connection with the bladder 410 in FIG. 4, heat from vaporized water can be transferred across the skin of the bladder as the vapor recondenses into liquid water on the inside wall of the bladder. The efficiency of this process can depend on the degree of thermal coupling between the bladder 410 and the lift gas outside the bladder, since the lift gas is generally cooler than the water vapor inside the bladder. One way to increase the efficiency of heat transfer from the outer wall of bladder 410 to the lift gas is to increase the effectiveness of convective heat transfer. In accordance with example embodiments, the surface shape of the bladder can be fashioned to include baffles, ridges, or other topological structures that tend to increase convective contact between the bladder wall and the lift gas.

Figure 6:
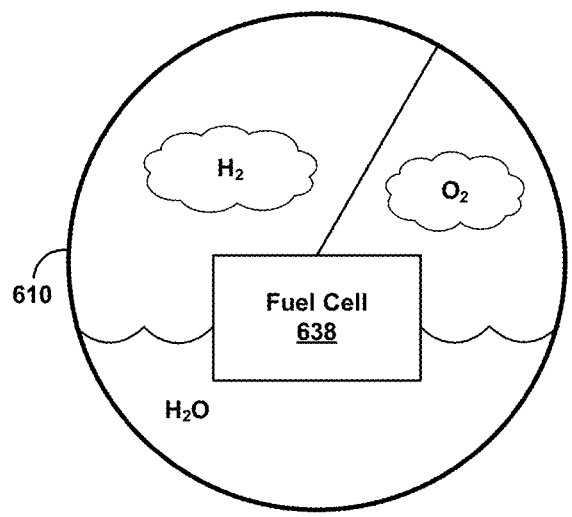
FIG. 6 is a simplified block diagram illustrating certain aspects of a component of a high-altitude balloon, according to an example embodiment.
Figure 6:
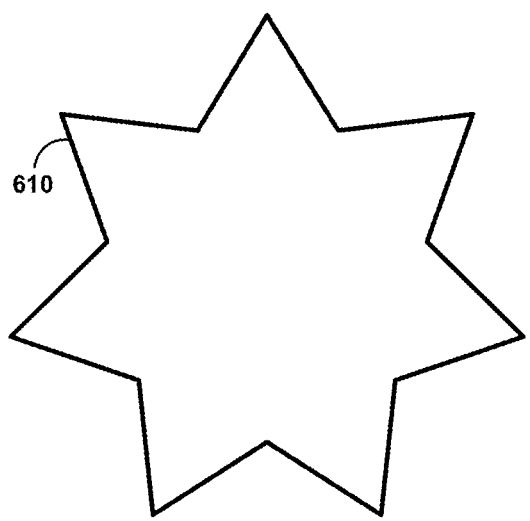

FIG. 6 is a schematic representation of one form of baffling that could be incorporated into the shape of a bladder 610. A side view of the bladder 610 is shown at the top of FIG. 6. This corresponds to the view of the bladder 310, 410, and 510 shown in each of FIGS. 3, 4, and 5, respectively. As shown in the side view, the bladder 610 includes a fuel cell 638, as well as $H_2$, $O_2$, and a water reservoir. By way of example, the bladder 610 is represented as circular in the side view. In practice, the bladder 610 need not necessarily be perfectly circular in the cross-section of the side view. For example, the bladder 610 could have an oval or pear-shaped profile (side view). The bottom of FIG. 6 shows a top view of the bladder 610, in which the bladder is depicted as star-shaped. The star-shaped form is meant to be representative of a baffled surface, which could have many more baffles than the seven "points" shown in FIG. 6. In particular, a baffled surface could help increase convective contact between the bladder surface and the lift gas, thereby increasing the efficiency of heat transfer from the inside to the outside of the bladder 610.

In accordance with example embodiments, both the bladder and the containment vessel can be closed containers, unlike the envelope that is open to the atmosphere at the bottom and controllably vented at the top. As a result, the internal pressure of one or both the bladder and containment vessel can exceed that of the internal pressure of the envelope (i.e. of the lift gas), possibly by a large amount. In particular, the possibility of a much larger internal pressure of one or both the bladder and containment vessel can be accommodated by construction each container to be a so-called "super-pressure container," capable of structurally maintaining much higher internal pressure than external pressure. Thus, in further accordance with example embodiments, the bladder and the containment vessel can be super-pressure containers.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 7:
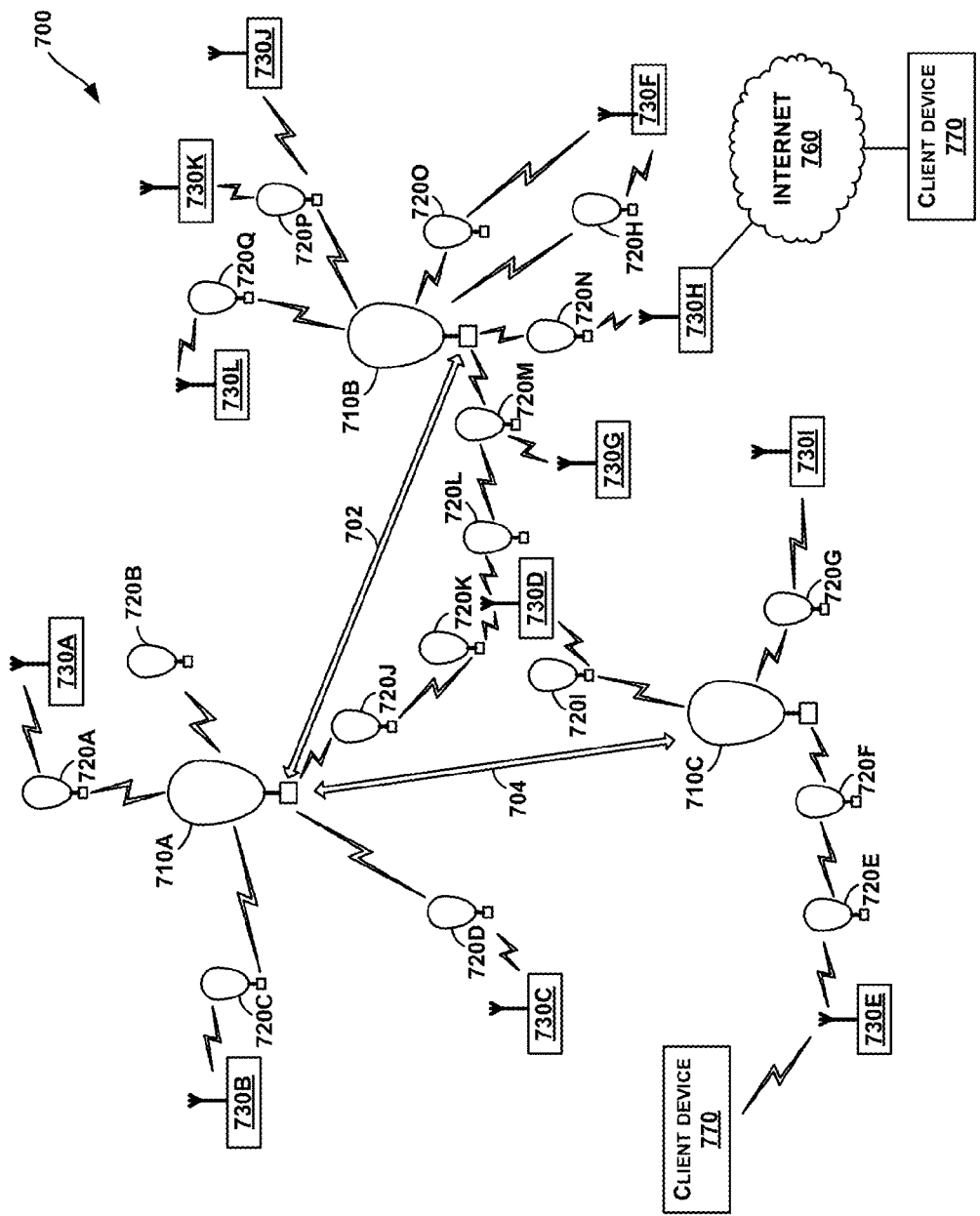
FIG. 7 is a simplified block diagram illustrating a balloon network that includes super-nodes and sub-nodes, according to an example embodiment.

FIG. 7 is a simplified block diagram illustrating a balloon network that includes super-nodes and sub-nodes, according to an example embodiment. More specifically, FIG. 7 illustrates a portion of a balloon network 700 that includes super-node balloons 710A to 710C (which may also be referred to as "super-nodes") and sub-node balloons 720 (which may also be referred to as "sub-nodes").

Each super-node balloon 710A to 710C may include a free-space optical communication system that is operable for packet-data communication with other super-node balloons.

As such, super-nodes may communicate with one another over optical links. For example, in the illustrated embodiment, super-node 710A and super-node 701B may communicate with one another over optical link 702, and super-node 710A and super-node 701C may communicate with one another over optical link 704.

Each of the sub-node balloons 720 may include a radio-frequency (RF) communication system that is operable for packet-data communication over one or more RF air interfaces. Accordingly, each super-node balloon 710A to 710C may include an RF communication system that is operable to route packet data to one or more nearby sub-node balloons 720. When a sub-node 720 receives packet data from a super-node 710, the sub-node 720 may use its RF communication system to route the packet data to a ground-based station 730 via an RF air interface.

As noted above, the super-nodes 710A to 710C may be configured for both longer-range optical communication with other super-nodes and shorter-range RF communications with nearby sub-nodes 720. For example, super-nodes 710A to 710C may use using high-power or ultra-bright LEDs to transmit optical signals over optical links 702, 704, which may extend for as much as 100 miles, or possibly more. Configured as such, the super-nodes 710A to 710C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 720 may be configured to connect the super-nodes 710 to other networks and/or to client devices.

Note that the data speeds and link distances described in the above example and elsewhere herein are provided for illustrative purposes and should not be considered limiting; other data speeds and link distances are possible.

In some embodiments, the super-nodes 710A to 710C may function as a core network, while the sub-nodes 720 function as one or more access networks to the core network. In such an embodiment, some or all of the sub-nodes 720 may also function as gateways to the balloon network 700. Additionally or alternatively, some or all of ground-based stations 730 may function as gateways to the balloon network 700.

4. Illustrative Methods

Figure 8:
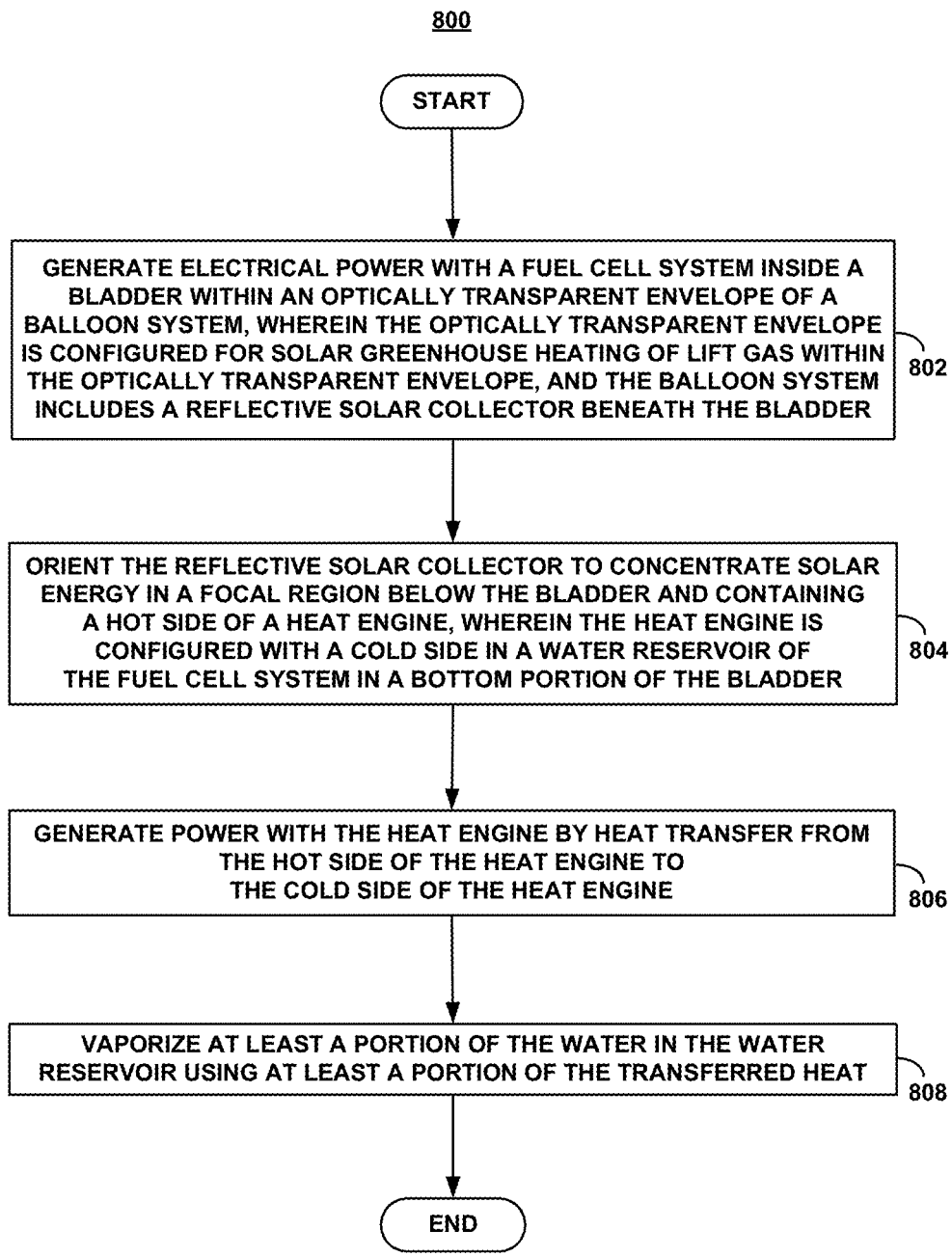
FIG. 8 is a flow chart illustrating a method, according to an example embodiment.
Figure 9:
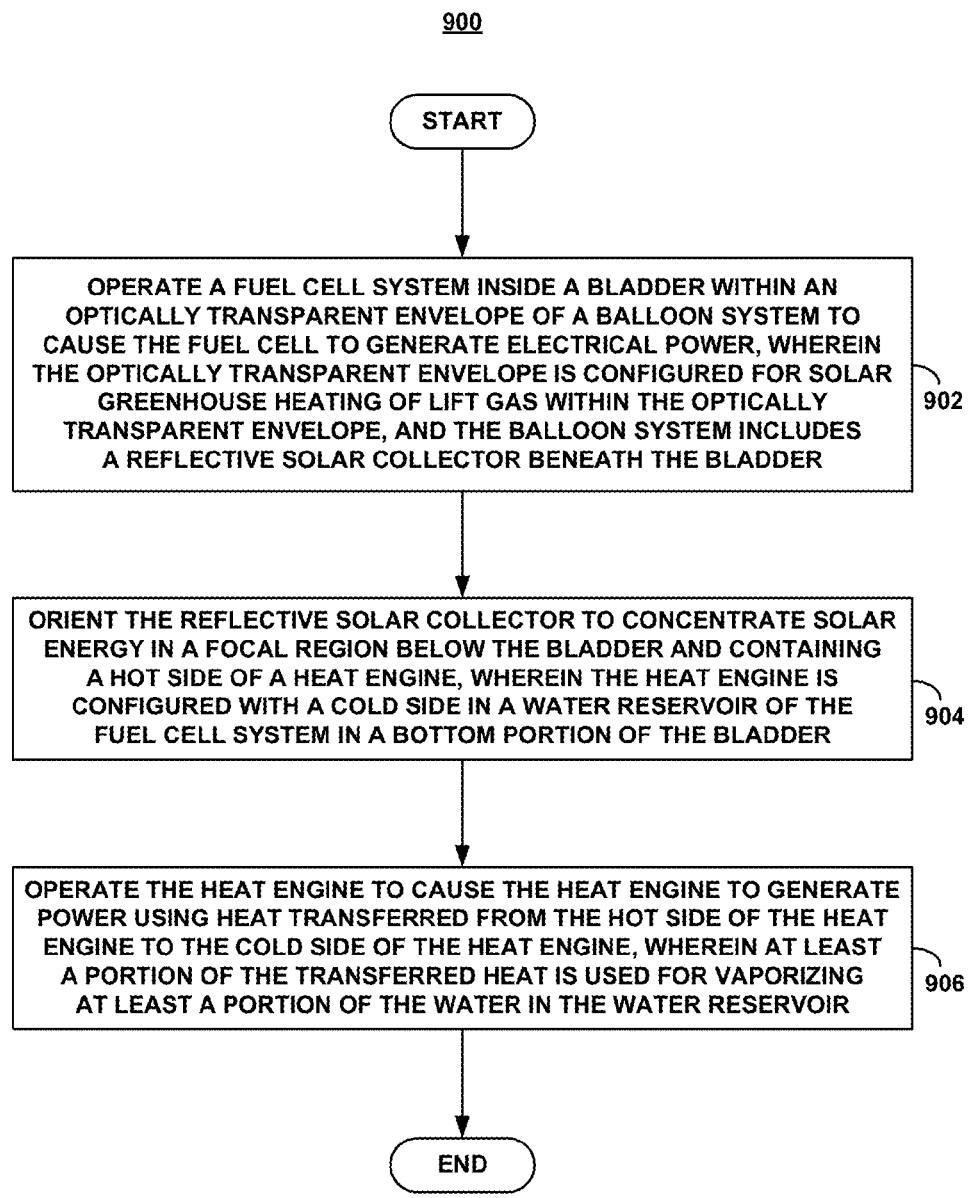
FIG. 9 is a flow chart illustrating a computer-implemented method, according to an example embodiment.
Figure 10:
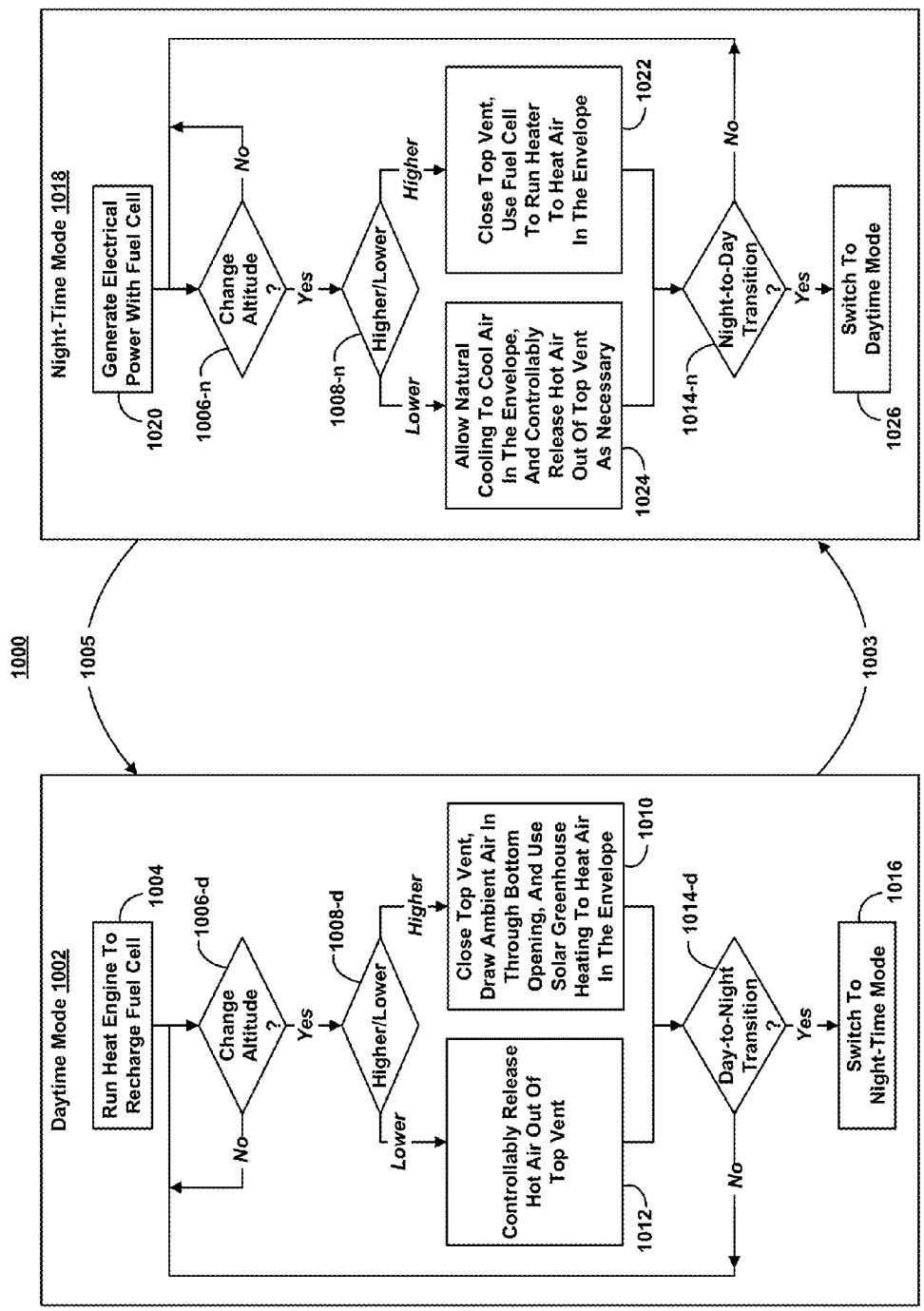
FIG. 10 is a combined operational state diagram illustrating the functions of a balloon that utilizes solar heating and a fuel cell for altitude control, according to an example embodiment.

FIGS. 8, 9, and 10 are flow charts illustrating methods 800, 900, and 1000, of operation of a balloon system having a solar collector and a heat-engine-drive fuel cell, according to an example embodiment. Example methods, such as methods 800, 900, and 1000, can be carried out by a balloon system, such balloon system 300 shown discussed above in connection with FIG. 3. More particularly, the example methods could be carried out and/or facilitated by a control system and/or by other components of balloon (e.g., part of a balloon payload). For example, the control system could include or be part of the positioning system 324 described above in connection with FIG. 3. Further, the example methods, or portions thereof, could be computer-implemented, taking the form of program instructions (e.g., machine language logic instructions) executable by one or more processors (e.g., processor 312) of an example balloon system (e.g., balloon system 300). In accordance with example embodiments, the executable program instructions of example methods (or portions thereof) could be stored on a non-transitory computer readable medium (e.g., memory 314 of FIG. 3, magnetic disk, CDROM, digital video disk (DVD), etc.). Program instructions stored in this manner could be made accessible to one or more processors for execution as part of system construction and/or initialization. An example system for carrying out example methods could include other software, hardware, and/or firmware. In addition, control functions, such as those illustrated by way of example below, could be carried out, at least in part, by a ground-based, satellite-based, or other remote control system, and communicated to the high-altitude balloon.

Example methods may be implemented as part of a balloon's altitude control process. Yet further, example methods may be implemented as part of or in conjunction with a balloon's power generation and/or power management processes.

As shown in block 802, electrical power is generated with a fuel cell system inside a bladder within an optically transparent envelope of a balloon system. In accordance with example embodiments, the optically transparent envelope is configured for solar greenhouse heating of lift gas within the optically transparent envelope, and the balloon system includes a reflective solar collector beneath the bladder.

As shown in block 804, the reflective solar collector is oriented to concentrate solar energy in a focal region below the bladder and containing a hot side of a heat engine. In accordance with example embodiments, the heat engine is configured with a cold side in a water reservoir of the fuel cell system in a bottom portion of the bladder.

At block 806, power is generated with the heat engine by heat transfer from the hot side of the heat engine to the cold side of the heat engine.

Finally, as shown in block 808, at least a portion of the water in the water reservoir is vaporized using at least a portion of the transferred heat.

In one example, the lift gas can be atmospheric air drawn into the optically transparent envelope through an opening at the bottom of the optically transparent envelope. In addition, the optically transparent envelope can include an adjustable vent. Then, in further accordance with example embodiments, the example method can also entail increasing buoyancy of the balloon system by heating the lift gas within the optically transparent envelope, and decreasing the buoyancy of the balloon system by controllably releasing at least portion of the lift gas through the adjustable vent. Furthermore, a balance can be created between increasing buoyancy of the balloon system from heating the lift gas and decreasing the buoyancy of the balloon system from controllably releasing the lift gas. In particular, the balance can correspond to a net buoyancy that causes the balloon system to float at a given altitude. By way of example, a desired net buoyancy could be determined by a control system of the balloon system, and an amount of heating and/or cooling of the lift gas could be determined so as to achieve the desired net buoyancy. Alternatively, heating and/or cooling of the lift gas could be carried out so as to cause the balloon system to float at the given altitude.

In accordance with example embodiments, heating the lift gas within the optically transparent envelope comprises could entail solar greenhouse heating of the lift gas during times of daylight when the sun is above the local horizon of the balloon system, and powering a heater with the electrical power generated with the fuel cell during night-time when the sun is below the local horizon of the balloon system. In addition, a portion of the electrical power generated with the fuel cell can be used to operate one or more electrically-powered devices of the balloon system.

Also in accordance with example embodiments, a portion of the power generated with the heat engine could be used to recharge the fuel cell system. More specifically, using the portion of the power generated with the heat engine to recharge the fuel cell system could entail generating electricity with a portion of the power generated with the heat engine, and using the generated electricity to run the fuel cell in reverse.

In accordance with example embodiments, the fuel cell system could be a hydrogen fuel cell. As such, the fuel cell could include a supply of hydrogen gas, a supply of oxygen gas, and the water reservoir in the bottom portion of the bladder. For such a configuration, generating electrical power with the fuel cell system can entail converting a portion of the hydrogen gas and a portion of the oxygen gas into produced water by a chemical process that generates electricity and releases heat, and storing the produced water in the reservoir.

In further accordance with example embodiments, using the portion of the power generated with the heat engine to recharge the fuel cell system can entail converting a portion of the water in the reservoir into recovered hydrogen gas and recovered oxygen gas by a chemical process that dissociates $H_2O$ into hydrogen gas and oxygen gas, storing the recovered hydrogen gas with the supply of hydrogen gas, and storing the recovered oxygen gas with the supply of oxygen gas.

In accordance with example embodiments, orienting the reflective solar collector to concentrate solar energy in the focal region below the bladder and containing the hot side of the heat engine can entail concentrating solar energy in the focal region by a concentration factor in a range of 10 to 1,000. By doing so, the hot side of the heat engine can be heated to a temperature in a range of 100° C. to 1,000° C.

Also in accordance with example embodiments, orienting the reflective solar collector to concentrate solar energy in the focal region below the bladder and containing a hot side of a heat engine can entail causing the reflective solar collector to track the sun during times of daylight when the sun is above the local horizon of the balloon system. In one example, the reflective solar collector can be of a reflective parabolic surface having a focal region between its surface and the bladder. In another example, the reflective solar collector can be a reflective spherical-section surface, again having a focal region between its surface and the bladder.

In accordance with example embodiments, vaporizing at least a portion of the water in the water reservoir using at least a portion of the transferred heat can entail a process of disposing of surplus heat transferred from the hot side to the cold side of the heat engine. For example, the surplus heat could be a portion of excess transferred heat not used for generating power with the heat engine. Further, a portion of the disposed surplus heat can be transferred from the bladder to the lift gas in the optically transparent envelope.

FIG. 9 illustrates an alternative example method 900 of operation of a balloon system having a solar collector and a heat-engine-drive fuel cell. The example method illustrated in FIG. 9 is more specifically cast in the form of a computer-implemented method than is the example method of FIG. 8. That is, the step of the method 900 can be carried out by a computer or computer processor executing computer (e.g., machine language) instructions, for example.

As shown in block 902, a fuel cell system is operated inside a bladder within an optically transparent envelope of a balloon system to cause the fuel cell to generate electrical power. The optically transparent envelope can be configured for solar greenhouse heating of lift gas within the optically transparent envelope, and the balloon system includes a reflective solar collector beneath the bladder.

As shown in block 904, the reflective solar collector is oriented to concentrate solar energy in a focal region below the bladder and containing a hot side of a heat engine. In accordance with example embodiments, the heat engine is configured with a cold side in a water reservoir of the fuel cell system in a bottom portion of the bladder.

Finally, at block 906, the heat engine is operated so as to cause it to generate power using heat transferred from the hot side of the heat engine to the cold side of the heat engine. In accordance with example embodiments, at least a portion of the transferred heat can be used for vaporizing at least a portion of the water in the water reservoir.

FIG. 10 illustrates an alternative form of display of the method 800 of FIG. 8 and/or of the method 900 of FIG. 9, combining a simplified flowchart with an operational state diagram to depict a method 1000 of operating of a balloon system having a solar collector and a heat-engine-drive fuel cell, according to an example embodiment. More specifically, a balloon system can operate in a daytime mode 1002 and/or a night-time mode 1018. As shown, the balloon can make a transition 1003 from the daytime mode 1002 to the night-time mode 1018, and a transition 1005 from the night-time mode 1018 to the daytime mode 1002. By way of example, the method 1000 will be described as generally being carried out by a control system of the balloon system. As described above, the balloon system can also include an optically-transparent envelope with an opening at the bottom and a controllable vent at the top. Referring again momentarily to FIG. 3, the balloon system could be the balloon system 300 and the control system could be the positioning system 324; various steps of the example method 1000 could be carried out by, or with assistance from, the processor 312.

At block 1004 in the daytime mode 1002, the control system operates a heat engine of the balloon system to recharge a fuel cell of the balloon system.

At block 1006-d, the control system determines whether or not a change in altitude of the balloon system is needed. If not ("No" branch from block 1006-d), the procedure just returns to checking again whether or not an altitude change is needed. If an altitude change is needed ("Yes" branch from block 1006-d), the control system determines at block 1008-d if the altitude needs to be increased or decreased.

If the altitude needs to be increased ("Higher" branch from block 1008-d), then at block 1010, the control system closes (or maintains closure of) the top vent in the balloon system envelope, and ambient (atmospheric) air drawn into the envelope from the opening at the bottom is allowed to be heated by solar greenhouse heating. The control system then proceeds to block 1014-d.

At block 1014-d, the control system determines if a day-to-night transition has been detected. For example, the control system could trigger a day-to-night transition based on a determination (e.g., using a solar ephemeris) that the sun is below threshold local elevation of the balloon. If a day-to-night transition has not been detected ("No" branch from block 1014-d), the control system returns to block 1006-d, where it again monitors for whether or not an altitude change is needed. If, instead, a day-to-night transition has been detected ("Yes" branch from block 1014-d), the control system proceeds to block 1016, where the transition 1003 is made to the night-time mode 1018.

If, at block 1008-d, the control system determines that the altitude needs to be decreased ("Lower" branch from block 1008-d), then at block 1012, the control system controllably releases hot lift gas from the envelope by opening the vent. The control system then proceeds to block 1014-d, following the steps described above for block 1014-d.

Operation in the night-time mode 1018 begins at block 1020, where the control system operates a fuel cell of the balloon system to generate electrical power.

At block 1006-n, the control system determines whether or not a change in altitude of the balloon system is needed. If not ("No" branch from block 1006-n), the procedure just returns to checking again whether or not an altitude change is needed. If an altitude change is needed ("Yes" branch from block 1006-n), the control system determines at block 1008-n if the altitude needs to be increased or decreased.

If the altitude needs to be increased ("Higher" branch from block 1008-n), then at block 1022, the control system closes (or maintains closure of) the top vent in the balloon system envelope, and operates a heater to heat ambient (atmospheric) air drawn into the envelope from the opening at the bottom. Electricity generated by the fuel cell can be used to run an electric heater for this purpose. The control system then proceeds to block 1014-n.

At block 1014-n, the control system determines if a night-to-day transition has been detected. For example, the control system could trigger a night-to-day transition based on a determination (e.g., using a solar ephemeris) that the sun is above a threshold local elevation of the balloon. If a night-to-day transition has not been detected ("No" branch from block 1014-n), the control system returns to block 1006-n, where it again monitors for whether or not an altitude change is needed. If, instead, a night-to-day transition has been detected ("Yes" branch from block 1014-n), the control system proceeds to block 1026, where the transition 1005 is made to the daytime mode 1002.

If, at block 1008-n, the control system determines that the altitude needs to be decreased ("Lower" branch from block 1008-n), then at block 1024, the control system turns off the heater and allows the lift gas to cool by natural cooling (i.e., of the outside air), and possibly (e.g., as necessary) controllably releases hot lift gas from the envelope by opening the vent. The control system then proceeds to block 1014-n, following the steps described above for block 1014-n.

It will be appreciated that the steps shown in FIGS. 8, 9, and 10 are meant to illustrate methods in accordance with example embodiments. As such, various steps could be altered or modified, the ordering of certain steps could be changed, and additional steps could be added, while still achieving the overall desired operation.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon system comprising:
   an optically transparent envelope configured for solar greenhouse heating of lift gas within the optically transparent envelope;
   a bladder inside the optically transparent envelope;
   a fuel cell system inside the bladder, wherein the fuel cell system includes a supply of hydrogen gas, a supply of oxygen gas, and a water reservoir in a bottom portion of the bladder, and wherein the fuel cell system is configured to generate electricity;
   a reflective solar collector beneath the bladder configured to concentrate solar energy in a focal region inside the optically transparent envelope and below the bladder; and
   a heat engine configured with a hot side in the focal region of the reflective solar collector and a cold side in the water reservoir, wherein the heat engine is configured to generate power by transferring heat from the hot side to the cold side, and wherein a portion of the transferred heat is used for causing at least a portion of the water in the reservoir to vaporize.

2. The balloon system of claim 1, wherein the reflective solar collector is configured to concentrate solar energy in the focal region by being oriented with respect to the sun to concentrate solar energy in the focal region by a concentration factor in a range of 10 to 1,000, and
   wherein the hot side of the heat engine is configured to be heated to a temperature in a range of 100° C. to 1,000° C. by the concentrated solar energy in the focal region.

3. The balloon system of claim 1, wherein the reflective solar collector is one of a reflective parabolic surface having a focal region between its surface and the bladder, or a reflective spherical-section surface having a focal region between its surface and the bladder,
   and wherein the reflective solar collector is configured to concentrate solar energy in the focal region by being caused to track the sun during times of daylight when the sun is above the local horizon of the balloon system.

4. The balloon system of claim 1, wherein the heat engine is one of an thermo-mechanical heat engine, a thermo-acoustic heat engine, or a photo-voltaic device.

5. The balloon system of claim 1, wherein causing at least the portion of the water in the reservoir to vaporize comprises:
   disposing of surplus heat transferred from the hot side to the cold side of the heat engine, the surplus heat being a portion of excess transferred heat beyond that which is used for generating power with the heat engine; and
   transferring a portion of the disposed surplus heat from the bladder to the lift gas in the optically transparent envelope.

6. The balloon system of claim 1, wherein the balloon system is further configured for using a portion of the electrical power generated with the fuel cell to operate one or more electrically-powered devices of the balloon system.

7. The balloon system of claim 1, wherein the bladder is optically transparent,
   wherein the reflective solar collector is configured inside an optically transparent containment vessel within the optically transparent envelope and below the bladder,
   and wherein the focal region of the reflective solar collector is configured to be located within the optically transparent containment vessel.

8. The balloon system of claim 7, wherein the optically transparent envelope is configured for maintaining a gas pressure within the optically transparent envelope equal to atmospheric pressure outside of the optically transparent envelope,
   and wherein each of the bladder and the optically transparent containment vessel is configured for maintaining an internal gas pressure that is higher than the gas pressure within the optically transparent envelope.

9. The balloon system of claim 1, wherein the lift gas is atmospheric air drawn into the optically transparent envelope through an opening at the bottom of the optically transparent envelope,
   wherein the balloon system is configured to increase its buoyancy by heating the lift gas within the optically transparent envelope, and wherein the balloon system is configured to decrease its buoyancy by controllable release of at least portion of the lift gas from the optically transparent envelope through an adjustable vent in the optically transparent envelope.

10. The balloon system of claim 9, wherein the balloon system is further configured to create a balance between increased buoyancy from heating the lift gas and decreased buoyancy from controllable release of the lift gas, wherein the balance comprises a net buoyancy for causing the balloon system to float at a given altitude.

11. The balloon system of claim 9, wherein the balloon system is configured for heating the lift gas within the optically transparent envelope by solar greenhouse heating of the lift gas during times of daylight when the sun is above the local horizon of the balloon system,
   and wherein the balloon system is configured for heating the lift gas within the optically transparent envelope by powering a heater with the electrical power generated with the fuel cell during night-time when the sun is below the local horizon of the balloon system.

12. The balloon system of claim 9, wherein the balloon system is further configured for using a portion of the power generated with the heat engine to recharge the fuel cell system.

13. The balloon system of claim 12, wherein using the portion of the power generated with the heat engine to recharge the fuel cell system comprises:
   generating electricity with the portion of the power generated with the heat engine; and
   using the generated electricity to run the fuel cell in reverse.

14. The balloon system of claim 12, wherein the fuel cell system includes a supply of hydrogen gas, a supply of oxygen gas, and the water reservoir in the bottom portion of the bladder, and wherein the fuel cell system is configured to generate electricity by:
   converting a portion of the hydrogen gas and a portion of the oxygen gas into produced water by a chemical process that generates electricity and releases heat; and
   storing the produced water in the reservoir.

15. The balloon system of claim 14, wherein using the portion of the power generated with the heat engine to recharge the fuel cell system comprises:
   converting a portion of the water in the reservoir into recovered hydrogen gas and recovered oxygen gas by a chemical process that dissociates $H_2O$ into hydrogen gas and oxygen gas; and
   storing the recovered hydrogen gas with the supply of hydrogen gas, and storing the recovered oxygen gas with the supply of oxygen gas.

16. A method comprising:
   generating electrical power with a fuel cell system inside a bladder within an optically transparent envelope of a balloon system, the optically transparent envelope being configured for solar greenhouse heating of lift gas within the optically transparent envelope, and the balloon system including a reflective solar collector beneath the bladder;
   orienting the reflective solar collector to concentrate solar energy in a focal region below the bladder and containing a hot side of a heat engine, the heat engine being configured with a cold side in a water reservoir of the fuel cell system in a bottom portion of the bladder;
   generating power with the heat engine by heat transfer from the hot side of the heat engine to the cold side of the heat engine; and
   vaporizing at least a portion of the water in the water reservoir using at least a portion of the transferred heat.

17. The method of claim 16, wherein orienting the reflective solar collector to concentrate solar energy in the focal region below the bladder and containing the hot side of the heat engine comprises:
   concentrating solar energy in the focal region by a concentration factor in a range of 10 to 1,000; and
   heating the hot side of the heat engine to a temperature in a range of 100° C. to 1,000° C.

18. The method of claim 16, wherein the reflective solar collector is one of a reflective parabolic surface having a focal region between its surface and the bladder, or a reflective spherical-section surface having a focal region between its surface and the bladder,
   and wherein orienting the reflective solar collector to concentrate solar energy in the focal region below the bladder and containing a hot side of a heat engine comprises causing the reflective solar collector to track the sun during times of daylight when the sun is above the local horizon of the balloon system.

19. The method of claim 16, wherein the heat engine is one of an thermo-mechanical heat engine, a thermo-acoustic heat engine, or a photo-voltaic device.

20. The method of claim 16, wherein vaporizing at least a portion of the water in the water reservoir using at least a portion of the transferred heat comprises:
   disposing of surplus heat transferred from the hot side to the cold side of the heat engine, the surplus heat a portion of excess transferred heat beyond that which is used for generating power with the heat engine; and
   transferring a portion of the disposed surplus heat from the bladder to the lift gas in the optically transparent envelope.

21. The method of claim 16, further comprising using a portion of the electrical power generated with the fuel cell to operate one or more electrically-powered devices of the balloon system.

22. The method of claim 16, wherein the lift gas is atmospheric air drawn into the optically transparent envelope through an opening at the bottom of the optically transparent envelope, and wherein the method further comprises:
   increasing buoyancy of the balloon system by heating the lift gas within the optically transparent envelope; and
   decreasing the buoyancy of the balloon system by controllably releasing at least portion of the lift gas from the optically transparent envelope through an adjustable vent in the optically transparent envelope.

23. The method of claim 22, further comprising creating a balance between increasing buoyancy of the balloon system from heating the lift gas and decreasing the buoyancy of the balloon system from controllably releasing the lift gas, wherein the balance comprises a net buoyancy that causes the balloon system to float at a given altitude.

24. The method of claim 22, wherein heating the lift gas within the optically transparent envelope comprises:
   solar greenhouse heating of the lift gas during times of daylight when the sun is above the local horizon of the balloon system; and
   powering a heater with the electrical power generated with the fuel cell during night-time when the sun is below the local horizon of the balloon system.

25. The method of claim 22, wherein using the portion of the power generated with the heat engine to recharge the fuel cell system comprises:
   generating electricity with the portion of the power generated with the heat engine; and
   using the generated electricity to run the fuel cell in reverse.

26. The method of claim 16, further comprising using a portion of the power generated with the heat engine to recharge the fuel cell system.

27. The method of claim 26, wherein the fuel cell system includes a supply of hydrogen gas, a supply of oxygen gas, and the water reservoir in the bottom portion of the bladder, and wherein generating electrical power with the fuel cell system comprises:
- converting a portion of the hydrogen gas and a portion of the oxygen gas into produced water by a chemical process that generates electricity and releases heat; and
- storing the produced water in the reservoir.

28. The method of claim 27, wherein using the portion of the power generated with the heat engine to recharge the fuel cell system comprises:
- converting a portion of the water in the reservoir into recovered hydrogen gas and recovered oxygen gas by a chemical process that dissociates $H_2O$ into hydrogen gas and oxygen gas; and
- storing the recovered hydrogen gas with the supply of hydrogen gas, and storing the recovered oxygen gas with the supply of oxygen gas.

29. A computer-implemented method comprising:
- operating a fuel cell system inside a bladder within an optically transparent envelope of a balloon system to cause the fuel cell to generate electrical power, the optically transparent envelope being configured for solar greenhouse heating of lift gas within the optically transparent envelope, and the balloon system including a reflective solar collector beneath the bladder;
- orienting the reflective solar collector to concentrate solar energy in a focal region below the bladder and containing a hot side of a heat engine, the heat engine being configured with a cold side in a water reservoir of the fuel cell system in a bottom portion of the bladder; and
- operating the heat engine to cause the heat engine to generate power using heat transferred from the hot side of the heat engine to the cold side of the heat engine, wherein at least a portion of the transferred heat is used for vaporizing at least a portion of the water in the water reservoir.

30. A non-transitory computer readable medium having stored therein instructions that, upon execution by one or more processors of a balloon system, cause the balloon system to carry out functions including:
- operating a fuel cell system inside a bladder within an optically transparent envelope of the balloon system to cause the fuel cell to generate electrical power, wherein the optically transparent envelope is configured for solar greenhouse heating of lift gas within the optically transparent envelope, and the balloon system includes a reflective solar collector beneath the bladder;
- orienting the reflective solar collector to concentrate solar energy in a focal region below the bladder and containing a hot side of a heat engine, wherein the heat engine is configured with a cold side in a water reservoir of the fuel cell system in a bottom portion of the bladder; and
- operating the heat engine to cause the heat engine to generate power using heat transferred from the hot side of the heat engine to the cold side of the heat engine, wherein at least a portion of the transferred heat is used for vaporizing at least a portion of the water in the water reservoir.

* * * * *